US012107650B2

(12) United States Patent
Ly et al.

(10) Patent No.: US 12,107,650 B2
(45) Date of Patent: Oct. 1, 2024

(54) CHANNEL STATE INFORMATION REFERENCE SIGNAL CONFIGURATIONS FOR DYNAMIC ANTENNA PORT ADAPTATION

(71) Applicant: QUALCOMM Incorporated, San Diego, CA (US)

(72) Inventors: Hung Dinh Ly, San Diego, CA (US); Yu Zhang, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 17/700,207

(22) Filed: Mar. 21, 2022

(65) Prior Publication Data

US 2023/0299830 A1 Sep. 21, 2023

(51) Int. Cl.
*H04B 7/06* (2006.01)

(52) U.S. Cl.
CPC ......... *H04B 7/0626* (2013.01); *H04B 7/0639* (2013.01); *H04B 7/0645* (2013.01)

(58) Field of Classification Search
None
See application file for complete search history.

(56) References Cited

U.S. PATENT DOCUMENTS

| 2019/0157770 | A1 | 5/2019 | Park et al. |
| 2019/0363767 | A1* | 11/2019 | Onggosanusi ....... H04B 7/0626 |
| 2023/0291454 | A1* | 9/2023 | Chou ....................... H04B 7/10 |

OTHER PUBLICATIONS

International Search Report and Written Opinion—PCT/US2023/015491—ISA/EPO—Jun. 21, 2023.
Qualcomm Incorporated: "CSI Enhancements: MTRP and FR1 FDD Reciprocity", 3GPP TSG RAN WG1 #103-e, R1-2009256, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020 Oct. 24, 2020, XP051946919, 13 Pages, section 2.1.
Qualcomm Incorporated: "Remaining Issues on CSI Enhancement for MU-MIMO Support", 3GPP TSG RAN WG1#100-e, R1-2002550, 3rd Generation Partnership Project, Mobile Competence Centre, 650, Route Des Lucioles, F-06921 Sophia-Antipolis Cedex, France, vol. RAN WG1, No. Apr. 20, 2020-Apr. 30, 2020 Apr. 11, 2020, XP051875664, 15 Pages, section 4, section 4.3.

* cited by examiner

*Primary Examiner* — Anh Ngoc M Nguyen
(74) *Attorney, Agent, or Firm* — Holland & Hart LLP

(57) ABSTRACT

Methods, systems, and devices for wireless communications are described. A network entity may output a channel state information (CSI) report message that indicates multiple codebook configurations. A UE may receive the CSI report message indicating a set of codebook configurations associated with a set of antenna port configurations. The UE may transmit a CSI report indicating one or more codebook configurations of the set of codebook configurations, where CSI included in the CSI report is based on the one or more codebook configurations. The UE may then communicate with a network entity based on the channel state information report indicating the one or more codebook configurations.

26 Claims, 17 Drawing Sheets

| New Resource 405 | Number of Ports 410 | CRI 420 (If CMR 0) | CRI 425 (If CMR 1) |
|---|---|---|---|
| CDM Group #0 | 4 | 000 | 100 |
| CDM Group #0 and CDM Group #1 | 8 | 001 | 101 |
| CDM Group #0 and CDM Group #1 and CDM Group #2 | 12 | 010 | 110 |

| CRI 430 | CMR 435 | | | CMR 440 | | |
|---|---|---|---|---|---|---|
| | CDM 445 | CDM 450 | CDM 455 | CDM 460 | CDM 465 | CDM 470 |
| 0 | 1 | 0 | 0 | 0 | 0 | 0 |
| 1 | 1 | 1 | 0 | 0 | 0 | 0 |
| 2 | 1 | 1 | 1 | 0 | 0 | 0 |
| 3 | 0 | 0 | 0 | 1 | 0 | 0 |
| 4 | 0 | 0 | 0 | 1 | 1 | 0 |
| 5 | 0 | 0 | 0 | 1 | 1 | 1 |

CHANNEL STATE INFORMATION REFERENCE SIGNAL CONFIGURATIONS FOR DYNAMIC ANTENNA PORT ADAPTATION

FIELD OF TECHNOLOGY

The following relates to wireless communication, including channel state information (CSI) reference signal (RS) configurations for dynamic antenna port adaptation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support channel state information (CSI) reference signal (RS) configurations for dynamic antenna port adaptation. A network entity may output a CSI report configuration message that indicates multiple codebook configurations. A user equipment (UE) may receive the CSI report configuration message and measure characteristics of a CSI-RS according to codebook configurations of the multiple codebook configurations. In some cases, the characteristics may include a CSI-RS resource indicator (CRI), a precoding matrix indicator (PMI), other characteristics, or any combination thereof. The UE may transmit a CSI report that includes an indication of one or more codebook configurations associated with the measured characteristics. In some cases, the indication may be an explicit indication and include a field indicating an index of the codebook configurations used for determining the CSI report. In some examples, the indication may be an implicit indication indicating the codebook configurations used for determining the CSI report. To support the implicit indication, the UE may determine a bitwidth of the CRI based on selecting resources (e.g., channel measurement resources (CMR)) and code division multiplexing (CDM) groups of the resources. In some cases, the CRI may include two portions, a first portion associated with the CMR selection, and a second portion associated with the CDM group selection. In some cases, the CMR selection and the CDM group selection may be jointly encoded. In some examples, a bitwidth of the PMI may be based on the codebook configurations used for the measurements.

A method for wireless communication at a UE is described. The method may include receiving a CSI report configuration message indicating a set of multiple codebook configurations associated with a set of multiple antenna port configurations, transmitting a CSI report indicating one or more codebook configurations of the set of multiple codebook configurations, where CSI included in the CSI report is based on the one or more codebook configurations, and communicating with a network entity based on the CSI report indicating the one or more codebook configurations.

An apparatus for wireless communication at a UE is described. The apparatus may include a processor, memory coupled with the processor, and instructions stored in the memory. The instructions may be executable by the processor to cause the apparatus to receive a CSI report configuration message indicating a set of multiple codebook configurations associated with a set of multiple antenna port configurations, transmit a CSI report indicating one or more codebook configurations of the set of multiple codebook configurations, where CSI included in the CSI report is based on the one or more codebook configurations, and communicate with a network entity based on the CSI report indicating the one or more codebook configurations.

Another apparatus for wireless communication at a UE is described. The apparatus may include means for receiving a CSI report configuration message indicating a set of multiple codebook configurations associated with a set of multiple antenna port configurations, means for transmitting a CSI report indicating one or more codebook configurations of the set of multiple codebook configurations, where CSI included in the CSI report is based on the one or more codebook configurations, and means for communicating with a network entity based on the CSI report indicating the one or more codebook configurations.

A non-transitory computer-readable medium storing code for wireless communication at a UE is described. The code may include instructions executable by a processor to receive a CSI report configuration message indicating a set of multiple codebook configurations associated with a set of multiple antenna port configurations, transmit a CSI report indicating one or more codebook configurations of the set of multiple codebook configurations, where CSI included in the CSI report is based on the one or more codebook configurations, and communicate with a network entity based on the CSI report indicating the one or more codebook configurations.

In some examples of the method, apparatuses, and non-transitory computer-readable medium described herein, transmitting the CSI report may include operations, features, means, or instructions for transmitting an indication based on a set of multiple resources indicated in the CSI report configuration message and the set of multiple codebook configurations, where the indication includes an implicit indication of the one or more codebook configurations.

Some examples of the method, apparatuses, and non-transitory computer-readable medium described herein may further include operations, features, means, or instructions for selecting one or more resources of the set of multiple resources indicated in the CSI report configuration message, selecting one or more multiplexed groups associated with resources mapped to the set of multiple antenna port configurations, and determining a bitwidth of the indication based on the selected one or more resources and the selected one or more multiplexed groups, where transmitting the CSI report may be further based on the determined bitwidth.

Some examples of the method, apparatuses, and non-transitory computer-readable medium described herein may further include operations, features, means, or instructions for determining a first portion of the indication based on selecting the one or more resources of the set of multiple resources and determining a second portion of the indication based on selecting the one or more multiplexed groups.

In some examples of the method, apparatuses, and non-transitory computer-readable medium described herein, jointly encoding the selected one or more resources and the selected one or more multiplexed groups, where the bitwidth of the indication may be determined based on the encoding, and where transmitting the CSI report may be further based on the determined bitwidth.

In some examples of the method, apparatuses, and non-transitory computer-readable medium described herein, the indication includes a CRI, the set of multiple resources indicated in the CSI report configuration message include CMRs, and one or more multiplexed groups associated with resources mapped to the set of multiple antenna port configurations include one or more CDM groups, where the indication may be further based on the one or more CDM groups.

In some examples of the method, apparatuses, and non-transitory computer-readable medium described herein, transmitting the CSI report may include operations, features, means, or instructions for transmitting a field indicating an index of the one or more codebook configurations of the set of multiple codebook configurations, where the field includes an explicit indication of the one or more codebook configurations.

Some examples of the method, apparatuses, and non-transitory computer-readable medium described herein may further include operations, features, means, or instructions for determining a constant bitwidth of the field based on a maximum number of codebook configurations configurable by the CSI report configuration message.

Some examples of the method, apparatuses, and non-transitory computer-readable medium described herein may further include operations, features, means, or instructions for determining a bitwidth for a CSI based on the one or more codebook configurations of the set of multiple codebook configurations, where transmitting the CSI report further includes transmitting the CSI.

A method for wireless communication at a network entity is described. The method may include outputting a CSI report configuration message indicating a set of multiple codebook configurations associated with a set of multiple antenna port configurations, obtaining a CSI report indicating one or more codebook configurations of the set of multiple codebook configurations, where CSI included in the CSI report is determined based on the one or more codebook configurations, and communicating with a UE based on the CSI report indicating the one or more codebook configurations.

An apparatus for wireless communication at a network entity is described. The apparatus may include a processor, memory coupled with the processor, and instructions stored in the memory. The instructions may be executable by the processor to cause the apparatus to output a CSI report configuration message indicating a set of multiple codebook configurations associated with a set of multiple antenna port configurations, obtain a CSI report indicating one or more codebook configurations of the set of multiple codebook configurations, where CSI included in the CSI report is determined based on the one or more codebook configurations, and communicate with a UE based on the CSI report indicating the one or more codebook configurations.

Another apparatus for wireless communication at a network entity is described. The apparatus may include means for outputting a CSI report configuration message indicating a set of multiple codebook configurations associated with a set of multiple antenna port configurations, means for obtaining a CSI report indicating one or more codebook configurations of the set of multiple codebook configurations, where CSI included in the CSI report is determined based on the one or more codebook configurations, and means for communicating with a UE based on the CSI report indicating the one or more codebook configurations.

A non-transitory computer-readable medium storing code for wireless communication at a network entity is described. The code may include instructions executable by a processor to output a CSI report configuration message indicating a set of multiple codebook configurations associated with a set of multiple antenna port configurations, obtain a CSI report indicating one or more codebook configurations of the set of multiple codebook configurations, where CSI included in the CSI report is determined based on the one or more codebook configurations, and communicate with a UE based on the CSI report indicating the one or more codebook configurations.

In some examples of the method, apparatuses, and non-transitory computer-readable medium described herein, obtaining the CSI report may include operations, features, means, or instructions for obtaining an indication based on a set of multiple resources indicated in the CSI report configuration message and the set of multiple codebook configurations, where the indication includes an implicit indication of the one or more codebook configurations.

Some examples of the method, apparatuses, and non-transitory computer-readable medium described herein may further include operations, features, means, or instructions for determining a bitwidth of the indication, where the bitwidth may be determined based on selected one or more resources and selected one or more multiplexed groups associated with the CSI, where the obtaining the CSI report may be further based on the determined bitwidth.

Some examples of the method, apparatuses, and non-transitory computer-readable medium described herein may further include operations, features, means, or instructions for determining a first portion of the indication based on the selected one or more resources and determining a second portion of the indication based on the selected one or more multiplexed groups.

Some examples of the method, apparatuses, and non-transitory computer-readable medium described herein may further include operations, features, means, or instructions for determining a joint encoding of the selected one or more resources and the selected one or more multiplexed groups, where the bitwidth of the indication may be determined based on the joint encoding, and where obtaining the CSI report may be further based on the determined bitwidth.

In some examples of the method, apparatuses, and non-transitory computer-readable medium described herein, the indication includes a CRI, the set of multiple resources indicated in the CSI report configuration message include CMRs, and one or more multiplexed groups associated with resources mapped to the set of multiple antenna port configurations include one or more CDM groups, where the indication may be further based on the one or more CDM groups.

In some examples of the method, apparatuses, and non-transitory computer-readable medium described herein, obtaining the CSI report may include operations, features, means, or instructions for obtaining a field indicating an index of the one or more codebook configurations of the set of multiple codebook configurations, where the field includes an explicit indication of the one or more codebook configurations.

Some examples of the method, apparatuses, and non-transitory computer-readable medium described herein may further include operations, features, means, or instructions for determining a constant bitwidth of the field based on a maximum number of codebook configurations configurable by the CSI report configuration message.

Some examples of the method, apparatuses, and non-transitory computer-readable medium described herein may further include operations, features, means, or instructions for determining a CSI bitwidth included in the CSI report, where the CSI bitwidth may be associated with the one or more codebook configurations.

DETAILED DESCRIPTION

Figure 1:
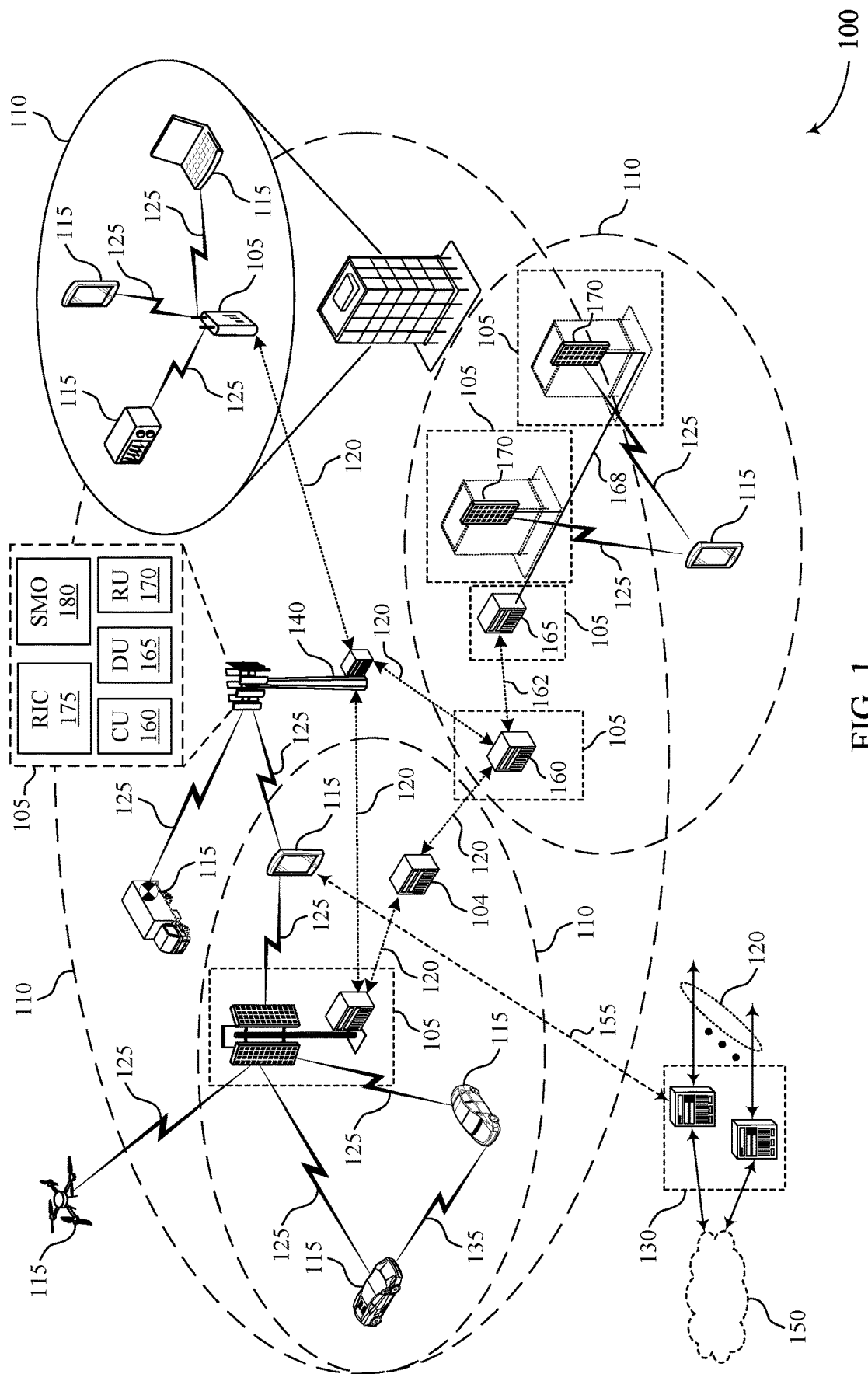
FIGS. 1 and 2 illustrate examples of wireless communications systems that support channel state information (CSI) reference signal (RS) configurations for dynamic antenna port adaptation in accordance with one or more aspects of the present disclosure.

In some wireless communications systems supporting dynamic antenna port adaptation techniques, a network entity may determine to dynamically power down or power up one or more antenna panels, subpanels, antenna ports, or any combination thereof (e.g., for energy efficiency during low cell load). In some cases, the network entity may perform dynamic antenna port adaptation based on receiving a channel state information (CSI) report from a user equipment (UE). For example, the network entity may transmit a codebook configuration indicating at least an antenna port configuration (e.g., a configuration of CSI resources from a set of CSI resources). The network entity may output a CSI reference signal (CSI-RS). The UE may measure one or more characteristics associated with the CSI-RS according to the codebook configuration and transmit a CSI report to the network entity. To support dynamic antenna adaptation, however, the network entity may configure multiple codebook configurations.

Aspects depicted in the present disclosure provide techniques for enhanced CSI-RS configurations for dynamic antenna port adaptation. In particular, a UE may utilize the techniques depicted herein to measure and report the one or more characteristics according to the multiple codebook configurations. For example, a network entity may output a CSI report configuration message that indicates multiple codebook configurations. A UE may receive the CSI report configuration message and may measure characteristics of a CSI-RS according to codebook configurations of the multiple codebook configurations. In some cases, the characteristics may include a CSI-RS resource indicator (CRI), a precoding matrix indicator (PMI), other characteristics, or any combination thereof. The UE may transmit a CSI report including an indication a codebook configuration associated with the measured characteristics. In some cases, the indication may be an explicit indication and include a field indicating an index of the codebook configurations used for the measurements. In some examples, the indication may be an implicit indication of the codebook configurations used for the measurements.

To support the implicit indication, the UE may determine a bitwidth of the CRI. For example, the UE may select resources included in the CSI report configuration message and may select code division multiplexing (CDM) groups of the resources. The UE may determine the bitwidth of the CRI based on the selected resources (e.g., channel measurement resources (CMR)) and CDM groups. In some cases, the CRI may include two portions, a first portion associated with the CMR selection, and a second portion associated with the CDM group selection. In some cases, the CMR selection and the CDM group selection may be jointly encoded. In some examples, a bitwidth of the PMI may be based on the codebook configurations used for the measurements.

Aspects of the disclosure are initially described in the context of wireless communications systems. Aspects of the disclosure are then described herein with respect to subsystem diagrams, various configurations, and a process flow. Aspects of the disclosure are further illustrated by and described herein with reference to apparatus diagrams, system diagrams, and flowcharts that relate to CSI-RS configurations for dynamic antenna port adaptation.

FIG. 1 illustrates an example of a wireless communications system 100 that supports CSI-RS configurations for dynamic antenna port adaptation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support CSI-RS configurations for dynamic antenna port adaptation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to any combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$conds, where $\Delta f_{max}$y represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use any combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a CSI-RS), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described herein with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems, the energy consumption may provide for a large portion (e.g., 23% of total expense) of expense. The high cost of energy consumption may be divided into separate categories of network elements, such as metro, service core, data center, residential and business, fixed access, and radio access network elements. Of these network elements, radio access (e.g., the radio access network (RAN)) may provide for a majority (e.g., 50.6%) of energy consumption. In wireless communications systems supporting 5G networks, specifically supporting 5G massive MIMO, the energy consumption may further be increased. In some cases, the power consumption of a network entity 105 (e.g., a base station) may increase with an increase in load. In these cases, a network entity 105 operating in the 5G network may consume a larger amount (e.g., 2.4 times to 3 times the amount based on load) than a network entity 105 operating in a 4G network.

To address the increase of power consumption, the wireless communications systems may implement various energy saving techniques. For example, in the wireless communications system 100, one or more wireless devices may support an adapted framework of a power consumption modeling and evaluation methodology at the network entity 105. The adapted framework may include relative energy consumption for downlink and uplink (e.g., power amplifier efficiency, number of transmitter resource units, base station load, etc.), sleep states and associated transition times, and one or more reference parameters or configurations. In some cases, the one or more wireless devices may support an evaluation methodology that targets evaluating system-level network energy consumption and energy savings, gains, as well as assessing or balancing impact to network and user performance, energy efficiency, UE power consumption, and complexity. The evaluation methodology may not use a single key performance indicator (KPI), but may reuse existing KPIs when applicable (e.g., when existing KPIs are found to be insufficient, new KPIs may be developed). In some examples, work groups may decide KPIs to evaluate and how to evaluate the KPIs. In some cases, the one or more wireless devices may support a dynamic or semi-static (e.g., a fine granularity adaptation) technique for transmissions or receptions in one or more network energy saving procedures in time, frequency, spatial, and power domains, with potential support or feedback from a UE 115 (e.g., potential UE assistance information in RAN1 or RAN2). In some examples, the technique may support information exchange or coordination over network interfaces (e.g., in RAN3).

In some cases, the energy saving techniques may include a dynamic network entity antenna port adaptation technique. Massive MIMO may be based on multiple co-located panels that include multiple antenna ports. Each panel may be equipped with a large number of power amplifiers and antenna subsystems that consume a lot of power. To support energy saving, a network entity 105 may implement the dynamic network entity antenna port adaptation technique where the network entity 105 may dynamically determine to turn off (e.g., reduce, stop, etc.) a portion or all of the panels, subpanels, antenna ports, or any combination thereof (e.g., when the cell load is low). In some implementations, the network entity 105 may configure resources (e.g., antenna ports) associated with the panels based on a codebook configuration included in a CSI report configuration.

In some cases, some wireless communications systems 100 may support a CSI report setting. In some examples, a UE 115 may receive an RRC including a CSI report configuration message. In some examples, the CSI report configuration may be per bandwidth part (BWP), and may include one or more of a non-zero power (NZP) CSI-RS resource configuration for channel measurement, a CSI-RS resource configuration for interference measurements (CSI-IM), and an NZP CSI-RS resource configuration for interference measurement, where each resource configuration may include a set of resources. In some cases, the set of resources may include a number of resources (Ks) associated with a same number of CSI-RS ports. For example, if Ks is one, then each resource may include thirty-two CSI-RS ports, and if Ks is two, each resource may include sixteen CSI-RS ports. Additionally or alternatively, if Ks is greater than two and less than or equal to eight, each resource may include eight CSI-RS ports. It is to be understood that these examples are illustrative in nature and not inclusive of all possible configurations. In some cases, a port resource may include port labeling from three thousand to three thousand plus the number of CSI-RS ports minus one (e.g., 3000+(P−1)).

In some examples, the CSI report configuration message may also indicate a codebook configuration and a report type (e.g., periodic, semi-persistent, or aperiodic). The codebook configuration may include a codebook type (e.g., type I single-panel, type I multiple panel, type II single panel, type II port selection, type II enhanced port selection, etc.), an antenna configuration (e.g., (N1,N2) for single panel and (Ng, N1, N2) for multiple panels), a discrete Fourier transform (DFT) beam restriction, and a rank indicator (RI) parameter. In some cases, each codebook type and a corresponding number of CSI-RS antenna ports may be supported by a specific antenna configuration. For example, Table 1 and Table 2 may be examples of a single panel configuration and a multiple panel configuration.

TABLE 1

| Number of CSI-RS antenna ports, $P_{CSI-RS}$ | $(N_1, N_2)$ | $(O_1, O_2)$ |
|---|---|---|
| 4 | (2, 1) | (4, 1) |
| 8 | (2, 2) | (4, 4) |
|  | (4, 1) | (4, 1) |
| 12 | (3, 2) | (4, 4) |
|  | (6, 1) | (4, 1) |
| 16 | (4, 2) | (4, 4) |
|  | (8, 1) | (4, 1) |
| 24 | (4, 3) | (4, 4) |
|  | (6, 2) | (4, 4) |
|  | (12, 1) | (4, 1) |
| 32 | (4, 4) | (4, 4) |
|  | (8, 2) | (4, 4) |
|  | (16, 1) | (4, 1) |

TABLE 2

| Number of CSI-RS antenna ports, $P_{CSI-RS}$ | $(N_g, N_1, N_2)$ | $(O_1, O_2)$ |
|---|---|---|
| 8 | (2, 2, 1) | (4, 1) |
| 16 | (2, 4, 1) | (4, 1) |
|  | (4, 2, 1) | (4, 1) |
|  | (2, 2, 2) | (4, 4) |
| 32 | (2, 8, 1) | (4, 1) |
|  | (4, 4, 1) | (4, 1) |
|  | (2, 4, 2) | (4, 4) |
|  | (4, 2, 2) | (4, 4) |

In some cases, the codebook types may include different configurations. For example, CSI type I may include a single slot for reporting the CSI report, where the CSI report includes two parts. A first part may include an RI or a CRI and a channel quality indicator (CQI) for a first codeword. A second part may include a PMI and a CQI for a second codeword (e.g., when RI may be greater than four). CSI type I may be supported for periodic, semi-persistent, or aperiodic CSI and included in a short or a long physical uplink control channel (PUCCH) and a physical uplink shared channel (PUSCH) (e.g., a type I sub-band CSI can be included in PUSCH and long PUCCH). An example of a codebook type may be a CSI type II. For instance, the CSI type II may also include two parts. A first part may include an RI, a CQI, and an indication of a number of non-zero wideband amplitude coefficients per layer. The first part may have a fixed payload size, where each field is encoded separately and is used to identify the number of info bits of a second part. The second part may include a PMI corresponding to indicated non-zero wideband amplitude coefficients per layer in the first part. CSI part II may be supported for semi-persistent and aperiodic CSI and may be carried on long PUCCH (e.g., the first part may be carried) and PUSCH (e.g., both the first part and the second part may be carried). In some cases, CSI parameters of a report may not be multiplexed across PUCCH or PUSCH transmissions and CSI reports on long PUCCH and on PUSCH are calculated independently (e.g., whether a UE 115 may be configured with a type II CSI report on both long PUCCH and PUSCH may be determined by a UE capability). In some examples, layer one reference signal received power (L1-RSRP) and resource indicators for beam management are mapped to the first part when reported on long PUCCH or PUSCH.

In some cases, the different fields (e.g., RI, CRI, CQI, etc.) of each codebook type may include a number of bits (e.g., a bitwidth) of the CSI report. For example, Table 3 may be an example of the RI, layer indicator (LI), CQI, and CRI bitwidths for a type I single panel CSI.

(e.g., values of Ng, N1, N2, O1, and O2), as described herein with reference to Tables 1 and 2. To support dynamic antenna adaptation, however, a network entity 105 may configure multiple codebook configurations that include various sets of CSI-RS resources. For example, a network entity 105 may configure a UE 115 with a CSI report configuration that includes multiple codebook or antenna configurations. In some cases, as described herein with reference to FIG. 3, a reduced resource or an aggregated resource may be formed based on each codebook configuration to measure (e.g., test) multiple types of antenna resource configurations and support dynamic antenna adaptation. Some techniques, however, may not support a procedure for the UE 115 to measure and report the CRI and the PMI according to the multiple codebook configurations. As such, codebook configuration and resource determination may benefit from enhancements on CRI signaling and/or bitwidth and PMI bitwidth.

The techniques described herein provide procedures for enhanced CSI-RS configurations for dynamic antenna port adaptation. For example, a network entity may output a CSI report configuration message that indicates multiple codebook configurations. A UE may receive the CSI report configuration message and measure characteristics of a CSI-RS according to the CSI report configuration message. In some cases, the characteristics may include a CRI, a PMI, other characteristics, or any combination thereof. The UE may transmit a CSI report that includes an indication of a codebook configuration associated with the measured characteristics. In some cases, the indication may be an explicit indication and include a field indicating an index of the codebook configurations used for the measurements. In some examples, the indication may be an implicit indication indicating the codebook configurations used for the measurements. To support the implicit indication, the UE 115 may determine a bitwidth of the CRI. For example, the UE 115 may select resources included in the CSI report configuration message and may select CDM groups of the

TABLE 3

| | Bitwidth | | | | |
|---|---|---|---|---|---|
| | | | | >4 antenna ports | |
| Field | 1 antenna port | 2 antenna ports | 4 antenna ports | Rank 1~4 | Rank 5~8 |
| Rank Indicator | 0 | $\min(1, \lceil \log_2 n_{RI} \rceil)$ | $\min(2, \lceil \log_2 n_{RI} \rceil)$ | $\lceil \log_2 n_{RI} \rceil$ | $\lceil \log_2 n_{RI} \rceil$ |
| Layer Indicator | 0 | $\lceil \log_2 v \rceil$ | $\min(2, \lceil \log_2 v \rceil)$ | $\min(2, \lceil \log_2 v \rceil)$ | $\min(2, \lceil \log_2 v \rceil)$ |
| Wide-band CQI for the first TB | 4 | 4 | 4 | 4 | 4 |
| Wide-band CQI for the second TB | 0 | 0 | 0 | 0 | 4 |
| Subband differential CQI for the first TB | 2 | 2 | 2 | 2 | 2 |
| Subband differential CQI for the Second TB | 0 | 0 | 0 | 0 | 2 |
| CRI | $\lceil \log_2(K_s^{CSI-RS}) \rceil$ | $\lceil \log_2(K_s^{CSI-RS}) \rceil$ | $\lceil \log_2(K_s^{CSI-RS}) \rceil$ | $\lceil \log_2(K_s^{CSI-RS}) \rceil$ | $\lceil \log_2(K_s^{CSI-RS}) \rceil$ |

Where $n_{RI}$ is a number of RI values, v is the value of the rank, and $K_s^{CSI-RS}$ is the number of CSI-RS resources (e.g., CMRs) in a corresponding resource set. In some examples, the values of the RI field may be mapped to the RI values with increasing order, where zero is mapped to the smallest RI value.

Figure 2:
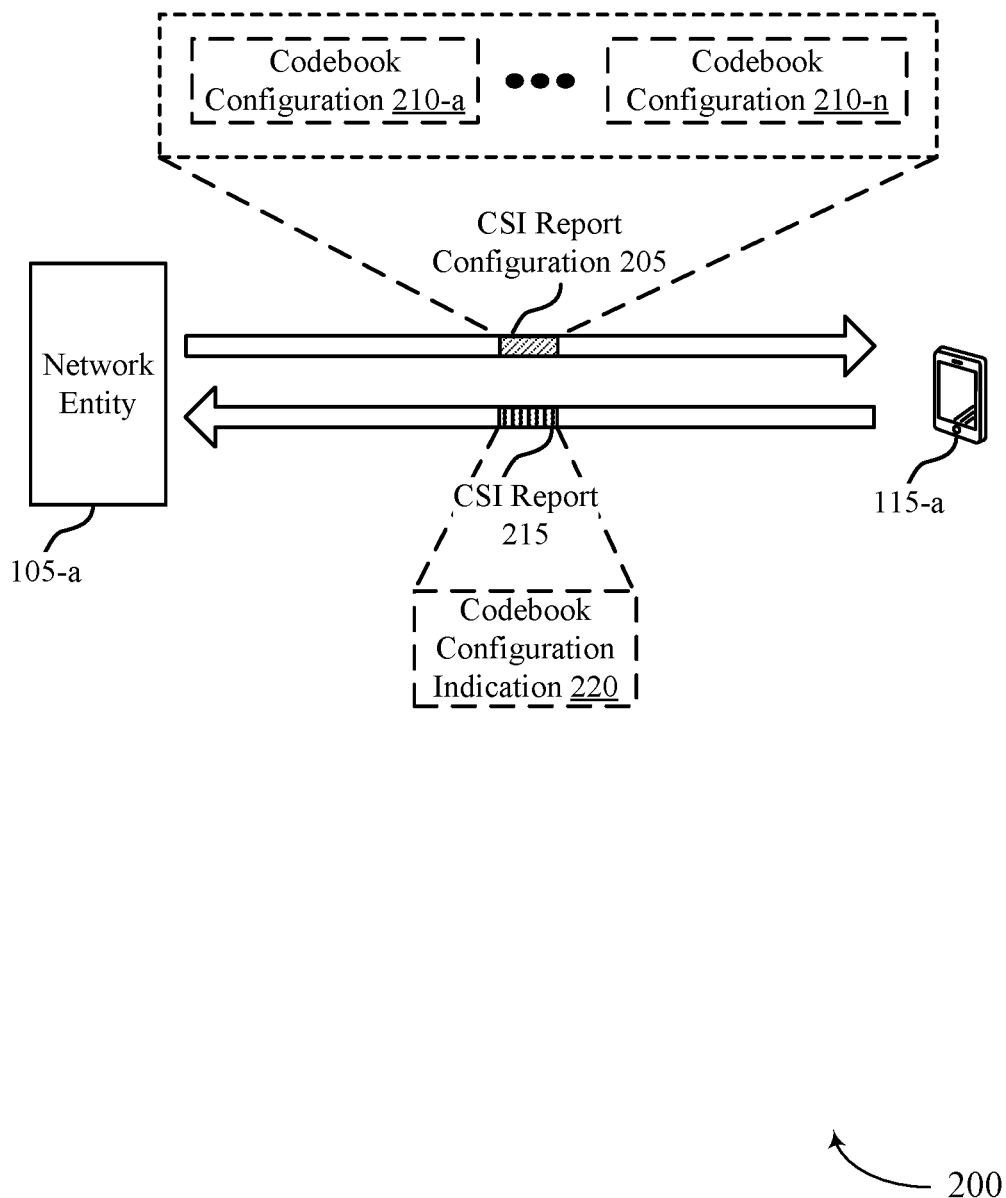

As described herein with reference to Table 3, the CRI bitwidth may depend on a number of CMRs in a CMR set. The PMI bitwidth may depend on a codebook configuration resources. The UE 115 may determine the bitwidth of the CRI based on the selected resources (e.g., CMR) and CDM groups. The bitwidth may imply which of the multiple codebook configurations were used. In some cases, the CRI may include two portions, a first portion associated with the CMR selection, and a second portion associated with the CDM group selection. In some cases, the CMR selection and the CDM group selection may be jointly encoded, where the CRI may indicate both simultaneously. In some examples, a bitwidth of the PMI may be based on the codebook configurations used for the measurements FIG. 2 illustrates an example of a wireless communications system 200 that supports CSI-RS configurations for dynamic antenna port adaptation in accordance with one or more aspects of the present disclosure. In some examples, the wireless communications system 200 may implement aspects of the wireless communications system 100. For example, the wireless communications system 200 may include a network entity 105-a and a UE 115-a, which may be examples of a network entity 105 and a UE 115 respectively, as described herein with reference to FIG. 1. The network entity 105-a and the UE 115-a may be in wireless communication.

In some cases, to support dynamic antenna adaptation, the network entity 105-a may output a CSI report configuration 205 that includes an indication of multiple codebook configurations 210 (e.g., codebook configuration 210-a through codebook configuration 210-N). The UE 115-a may receive the CSI report configuration 205 and measure characteristics of a CSI-RS according to one or more of the codebook configurations 210. In some examples, the characteristics may include an RI, an LI, a CRI, a CQI, a PMI, or any combination thereof, among other examples, as described herein with reference to Table 3 in FIG. 1. For example, the UE 115-a may measure the characteristics of a CSI-RS according to the codebook configuration 210-a. The characteristics associated with the codebook configuration 210-a may be different than characteristics associated with the codebook configuration 210-N. As such, the UE 115-a may indicate, to the network entity 105-a, which codebook configuration 210 was used to measure the characteristics (e.g., RI, LI, CRI, CQI, PMI, etc.).

In some cases, the UE 115-a may transmit, to the network entity 105-a, a CSI report 215 that indicates one or more codebook configurations in accordance with the codebook configuration indication 220. The codebook configuration indication 220 may indicate which codebook configuration 210 was used to measure the characteristics. For example, the CSI report configuration 205 may include multiple codebook configurations 210 for dynamic antenna adaptation, and in accordance with aspects of the present disclosure, the UE 115-a may indicate which codebook configuration 210 was used to determine the CSI report 215. In some examples, the UE 115-a may determine a PMI bitwidth based on the codebook configuration 210-a (e.g., a selected codebook) out of the multiple codebook configurations 210 in the CSI report configuration 205. For example, the codebook configuration 210-N may indicate a CSI resource including or otherwise indicating twelve CSI-RS ports. If the CSI-RS ports were reduced to four CSI-RS ports, as described herein with reference to FIG. 3, according to the codebook configuration 210-a (e.g., in a single panel), then the antenna configuration (e.g., N1, N2, O1, O2) value used to compute the PMI bitwidth may be associated with the reduced four CSI-RS port codebook configuration 210-a (e.g., instead of the twelve CSI-RS port codebook configuration 210-N). The UE 115-a may transmit the codebook configuration indication 220 indicating that the codebook configuration 210-a was used to measure the characteristics.

In some examples, the codebook configuration indication 220 may be an explicit indication or an implicit indication (e.g., in a case of resource reduction). For example, when explicitly indicated, the codebook configuration indication 220 may include a field indicating an index of the codebook configuration 210-a (e.g., the codebook configuration 210 associated with the CSI information included in the CSI report 215). In some cases, a bitwidth of the field may be based on a maximum number of codebook configurations 210 configured in the CSI report configuration 205 (e.g., keeping the bitwidth of the field constant). In some examples, the UE 115-a may include the field in a first portion of the CSI (e.g., CSI part-1), as described herein with reference to FIG. 1. An example of the implicit indication may include a bitwidth (e.g., a CRI bitwidth) that may be used to imply which codebook configuration 210 was used, as described herein with reference to FIG. 4.

Figure 3:
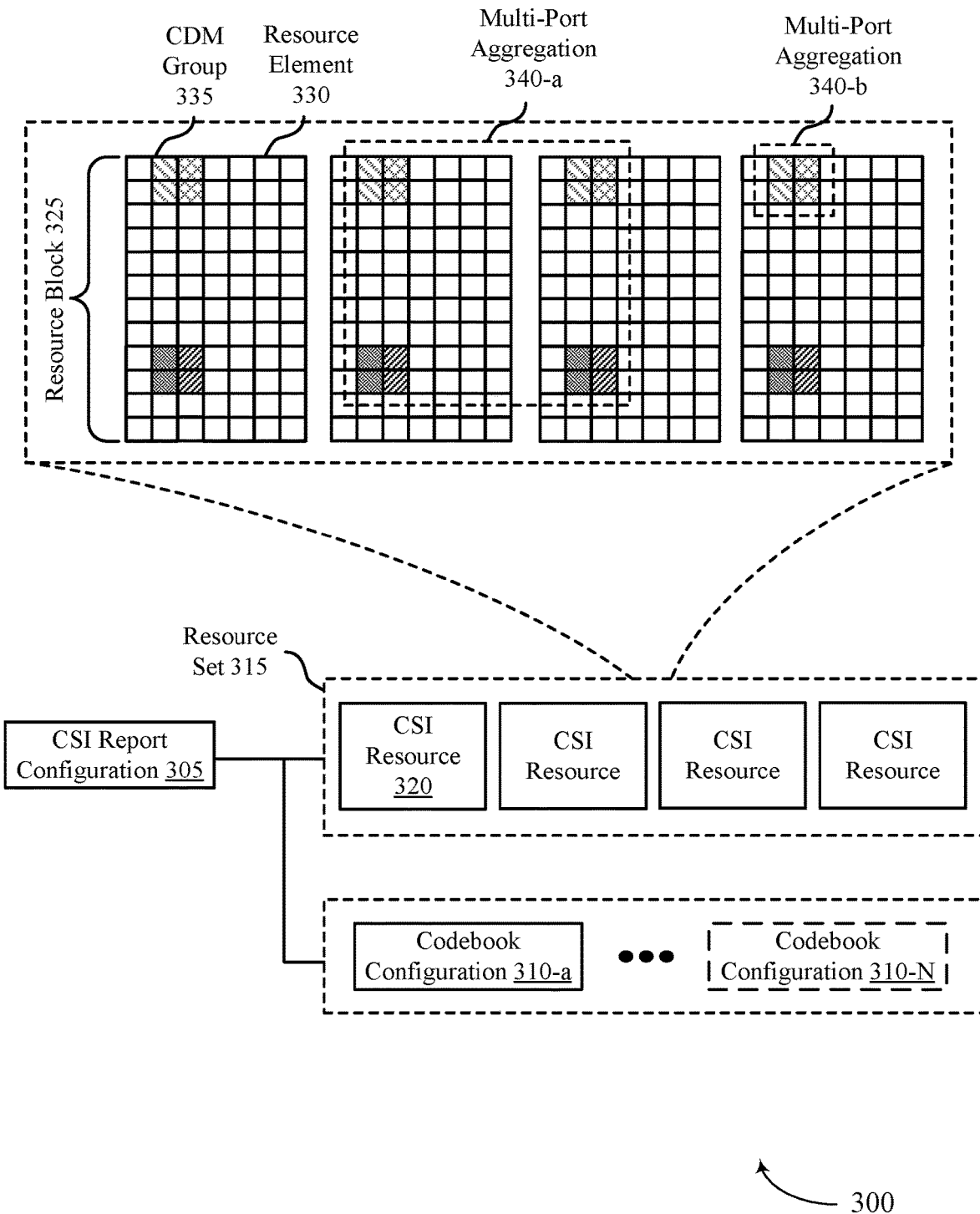
FIGS. 3, 4A, and 4B illustrate examples of configurations that support CSI-RS configurations for dynamic antenna port adaptation in accordance with one or more aspects of the present disclosure.

FIG. 3 illustrates an example of a configuration 300 that supports CSI-RS configurations for dynamic antenna port adaptation in accordance with one or more aspects of the present disclosure. In some examples, the configuration 300 may implement or be implemented by aspects of the wireless communications systems 100 and 200 as described herein with reference to FIGS. 1 and 2, respectively. The configuration 300 may include a CSI report configuration 305, which may be an example of the CSI report configuration 205, as described herein with reference to FIG. 2. The CSI report configuration 305 may include or indicate a set of CSI resources 320 (e.g., resource set 315), and a set of codebook configurations 310 (e.g., codebook configuration 310-a through 310-N).

In some cases, to support dynamic antenna adaptation, a network entity 105 may output the CSI report configuration 305 that includes an indication of the set of codebook configurations 310. A UE 115 may receive the CSI report configuration 305 and measure characteristics (e.g., one or more parameters) of a CSI-RS according to one or more of the set of codebook configurations 310. By measuring the CSI-RS in accordance with the different codebook configurations 310, the UE 115 may determine different characteristics associated with multiple types of antenna configurations and the network entity 105 may determine how to adapt antenna port resources based on the different characteristics. For example, the UE 115-a may measure the characteristics of a CSI-RS according to the codebook configuration 310-a. The characteristics associated with the codebook configuration 310-a may be different than characteristics associated with the codebook configuration 310-N. For example, the codebook configuration 310-a may include an antenna configuration of (N1, N2)=(4,4), which may indicate four by four antenna elements and thirty-two antenna ports (e.g., antenna resources), as described herein with reference to Table 1. The codebook configuration 310-N, meanwhile, may include an antenna configuration of (N1, N2)=(2,1), which may indicate two by one antenna elements and four antenna ports (e.g., antenna resources).

In some examples, for each codebook configuration 310 resources from the resource set 315 may be aggregated or reduced. For example, the CSI resources 320 of the resource set 315 may be configured in the CSI report configuration 305 with multiple codebook configurations 310 (e.g., antenna configurations) and aggregated or reduced to form a new CSI resource 320 with a larger or smaller number of CSI-RS ports. For example, the resource set 315 may include four CSI resources 320 that include eight CSI-RS ports each in a resource block 325 with multiple resource elements 330. The eight CSI-RS ports may be grouped into four CDM groups 335. In the example of multi-port aggregation 340-a, two CSI resources 320 may be aggregated to a resource including sixteen CSI-RS ports. This may be an example of resource aggregation. In the example of multi-port aggregation 340-b, a single CSI resource 320 may be reduced to form a new resource including four CSI-RS ports.

This may be an example of resource reduction. It is to be understood that the examples described herein are for illustrative purposes only. For example, for resource aggregation, the CSI resources 320 may be aggregated to form a new resource including sixteen, twenty-four, thirty-two, or more CSI-RS ports based on the number of CSI resources 320 aggregated. In the case of resource reduction, the new resource may be any subset of a CSI resource 320 (e.g., the new resource including four CSI-RS ports is a subset of the single CSI resource 320 that includes eight CSI-RS ports).

The UE 115 may indicate, to the network entity 105, the different characteristics associated with a respective codebook configuration 310 and each respective codebook configuration 310 that were used to measure the respective characteristics (e.g., RI, LI, CRI, CQI, PMI, etc.). In some cases, the UE 115-*a* may transmit, to the network entity 105-*a*, a CSI report that includes the different characteristics and a codebook configuration indication, as described herein with reference to FIGS. 2 and 4. For instance, the UE 115-*a* may transmit a CSI report indicating one or more codebook configurations, where the CSI included in the CSI report is based on the one or more codebook configurations. Based on the characteristics and the codebook configuration indication, the network entity 105 may determine to dynamically adapt the antenna port configurations.

Figure 4A:
Figure 4B:

FIGS. 4A and 4B illustrate examples of a configuration 400-*a* and a configuration 400-*b* respectively, that support CSI-RS configurations for dynamic antenna port adaptation in accordance with one or more aspects of the present disclosure. In some examples, the configuration 400-*a* and the configuration 400-*b* may implement or be implemented by aspects of the wireless communications system 100, the wireless communications system 200, and the configuration 300, as described herein with reference to FIGS. 1-3. For example, one or both of the configurations 400-*a* and 400-*b* may be implemented by one or both of a network entity 105 or a UE 115 to support techniques for enhanced CSI-RS configurations for dynamic antenna port adaptation.

In some cases, an indication of one or more codebook configurations associated with a CSI report may be an implicit indication. In some examples, a CRI bitwidth may be used as the implicit indication. For example, a UE 115 may receive the CSI report configuration that includes a number of CMRs in a CSI resource set and a number of configured codebooks. The CRI bitwidth may be based on the number of CMRs in the CSI resource set and the number of configured codebooks in the CSI report configuration.

The UE 115 may transmit a CSI report indicating one or more codebook configurations, where CSI included in the CSI report is based on the one or more codebook configurations. The UE 115 may transmit an indication based on a set of resources indicated in the CSI report configuration message and the multiple codebook configurations. For instance, the UE 115 may determine a first portion of an indication based on selecting the one or more resources of the set of resources indicated in a CSI report configuration message. The UE 115 may determine a second portion of the indication based on selecting one or more multiplexed groups associated with resources mapped to a set of antenna ports (e.g., antenna port configurations).

In the example of FIG. 4A, a CRI may include two portions. A first portion may include one or more bits associated with a CMR selection and a second portion may include one or more bits associated with a CDM group selection within the selected CMR. For example, the UE 115 may determine, based on a codebook configuration, to select a new resource 405 (e.g., a new reduced resource or a new aggregated resource) from the CMRs. The UE 115 may further select a CDM group based on the selected new resource 405 (e.g., a CDM group included in the new resource 405). In some examples, the UE 115 may select a CDM group #0, where the CDM group #0 includes a number of ports 410 (e.g., four). If the CMR is CMR 0, then the bitwise configuration of the CRI is 000. If the CMR is CMR 1, then the bitwise configuration of the CRI is 100. In another example, both a CDM group #0 and a CDM group #1 may be selected from the new resource 405. For CMR 0 and CMR 1, the bitwise configuration of the CRI is 001 and 101 respectively. In this way, the CRI may indicate both the selected CMR and the selected CDM group. Thus, the network entity 105 may determine which codebook configuration was used for the CSI report based on the indication including the CRI bitwidth.

In the example of FIG. 4B, a CRI bitwidth may be based on a joint encoding of both a CMR selection and a CDM group selection. In some cases, a CMR 435 (e.g., CMR 0) may be jointly encoded with a CDM 445 (e.g., CDM group #0), a CDM 450 (e.g., CDM group #1), or a CDM 455 (e.g., CDM group #2). Additionally or alternatively, a CMR 440 (e.g., CMR 1) may be jointly encoded with a CDM 460 (e.g., CDM group #0), a CDM 465 (e.g., CDM group #1), or a CDM 470 (e.g., CDM group #2). For example, a CRI 430 value of zero may indicate both the CMR selection of CMR 435 and the CDM selection of CDM 445. A CRI 430 value of four may indicate both the CMR selection of CMR 440 and the CDM selection of both CDM 460 and CDM 465. FIG. 4B depicts CRI 430 values from zero to five. In this way, the CRI may indicate both the selected CMR and the selected CDM group while potentially saving on signaling overhead. Thus, the network entity 105 may determine which codebook configuration was used of the CSI report based on the implicit indication of the CRI 430.

While the examples used are described herein with reference to FIG. 4A and FIG. 4B, it is to be understood that other these examples do not limit the techniques described herein. Other examples (e.g., other data structures, configurations, joint encoding, bitwise configurations, etc.) may be used to determine the CRI bitwidth and implicitly indicate the one or more codebook configurations. For example, the CRI 420 may indicate the selected CDM group in the first portion and the selected CMR in the second portion, among other examples.

Figure 5:
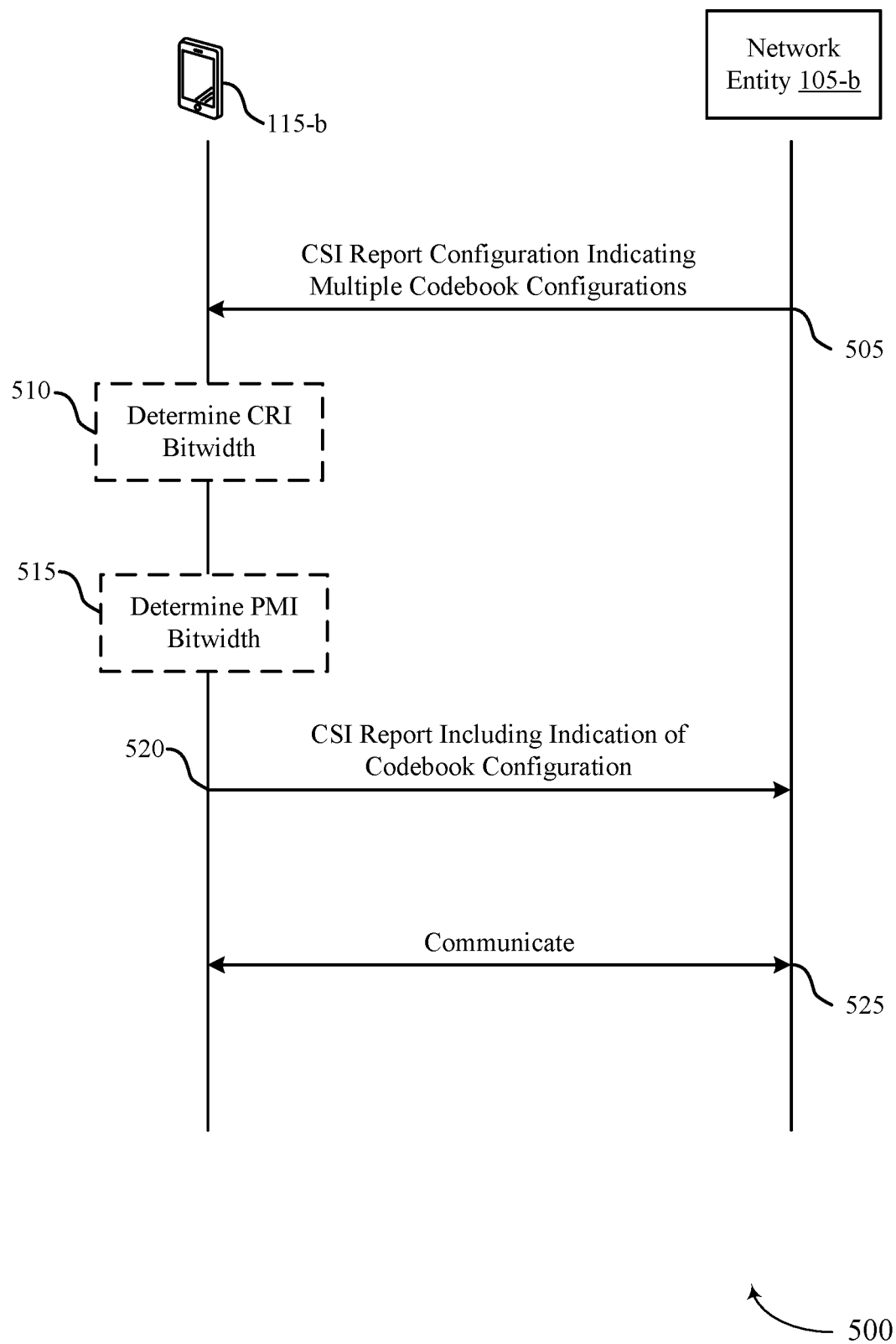
FIG. 5 illustrates an example of a process flow that supports CSI-RS configurations for dynamic antenna port adaptation in accordance with one or more aspects of the present disclosure.

FIG. 5 illustrates an example of a process flow 500 that supports CSI-RS configurations for dynamic antenna port adaptation in accordance with one or more aspects of the present disclosure. In some examples, the process flow 500 may implement or be implemented by aspects of the wireless communications systems 100 and 200 and the configurations 300, 400-*a*, and 400-*b*, as described herein with reference to FIGS. 1-4, respectively. For example, the process flow 500 may be implemented by a network entity 105-*b* and a UE 115-*b*, which may be respective examples of network entities 105 and UEs 115 as described herein with reference to FIGS. 1-4, respectively.

In the following description of the process flow 500, the operations between the network entity 105-*b* and the UE 115-*b* may be transmitted in a different order than the example order shown, or the operations performed by the network entity 105-*b* and the UE 115-*b* may be performed in different orders or at different times. Some operations may also be omitted from the process flow 500, and other operations may be added to the process flow 500.

At 505, the network entity 105-*b* may output a CSI report configuration indicating multiple codebook configurations associated with multiple antenna port configurations. The UE 115-*b* may receive the CSI report configuration. In some cases, the CSI report configuration may indicate multiple (e.g., a set of) resources (e.g., CMRs) and the UE 115-*b* may select one or more resources of the multiple resources based on one or more of the multiple codebook configurations. The UE 115-*b* may also select one or more multiplexed groups (e.g., CDM groups) associated with resources mapped to the multiple antenna port configurations (e.g., resources within the selected one or more resources) based on one or more of the multiple codebook configurations. The UE 115-*b* may measure characteristics (e.g., RI, LI, CRI, CQI, PMI, etc.) of a CSI-RS according to the selected resources and multiplexed groups.

In some cases, the UE 115-*b* may determine an explicit or implicit indication of the one or more codebook configurations associated with the measured characteristics. At 510, the UE 115-*b* may optionally determine a CRI bitwidth (e.g., the implicit indication). In some examples, the UE 115-*b* may determine the CRI bitwidth based on the selected resources, the selected multiplexed groups, or both. In some cases, a first portion of the CRI may be determined based on the selected resources (e.g., the first portion indicates the selected resources) and a second portion of the CRI may be determined based on the selected multiplexed groups (e.g., the second portion indicates the selected multiplexed groups). Additionally, or alternatively, the UE 115-*b* may jointly encode the selected resources and the selected multiplexed groups, where the CRI bitwidth is determined based on the joint encoding.

In some examples, the explicit indication of the one or more codebook configurations may be determined. For example, a CSI report may include a field indicating an index of the one or more codebook configurations. The UE 115-*b* may determine a constant bitwidth of the field based on a maximum number of codebook configurations configurable by the CSI report configuration (e.g., the multiple codebook configurations).

At 515, the UE 115-*b* may optionally determine a PMI bitwidth. In some cases, the PMI bitwidth may be based on the one or more codebook configurations. For example, the one or more codebook configurations may include a first codebook configuration that indicates a CSI resource with multiple CSI-RS ports. A second codebook configuration of the codebook configurations may indicate a subset of the CSI resource with less CSI-RS ports. If the second codebook configuration is used to select the CSI resources for measuring the characteristics of the CSI-RS, then the PMI bitwidth may be determined based on the second codebook configuration (e.g., instead of the first codebook configuration).

At 520, the UE 115-*b* may transmit the CSI report that includes the indication (e.g., implicit or explicit) of the one or more codebook configurations. The network entity 105-*b* may obtain the CSI report and determine which codebook configuration (e.g., the one or more codebook configurations) of the multiple codebook configurations indicated by the CSI report configuration is associated with the CSI report based on the indication. At 525, the UE 115-*b* may communicate with the network entity 105-*b* based on the CSI report indicating the one or more codebook configurations.

Figure 6:
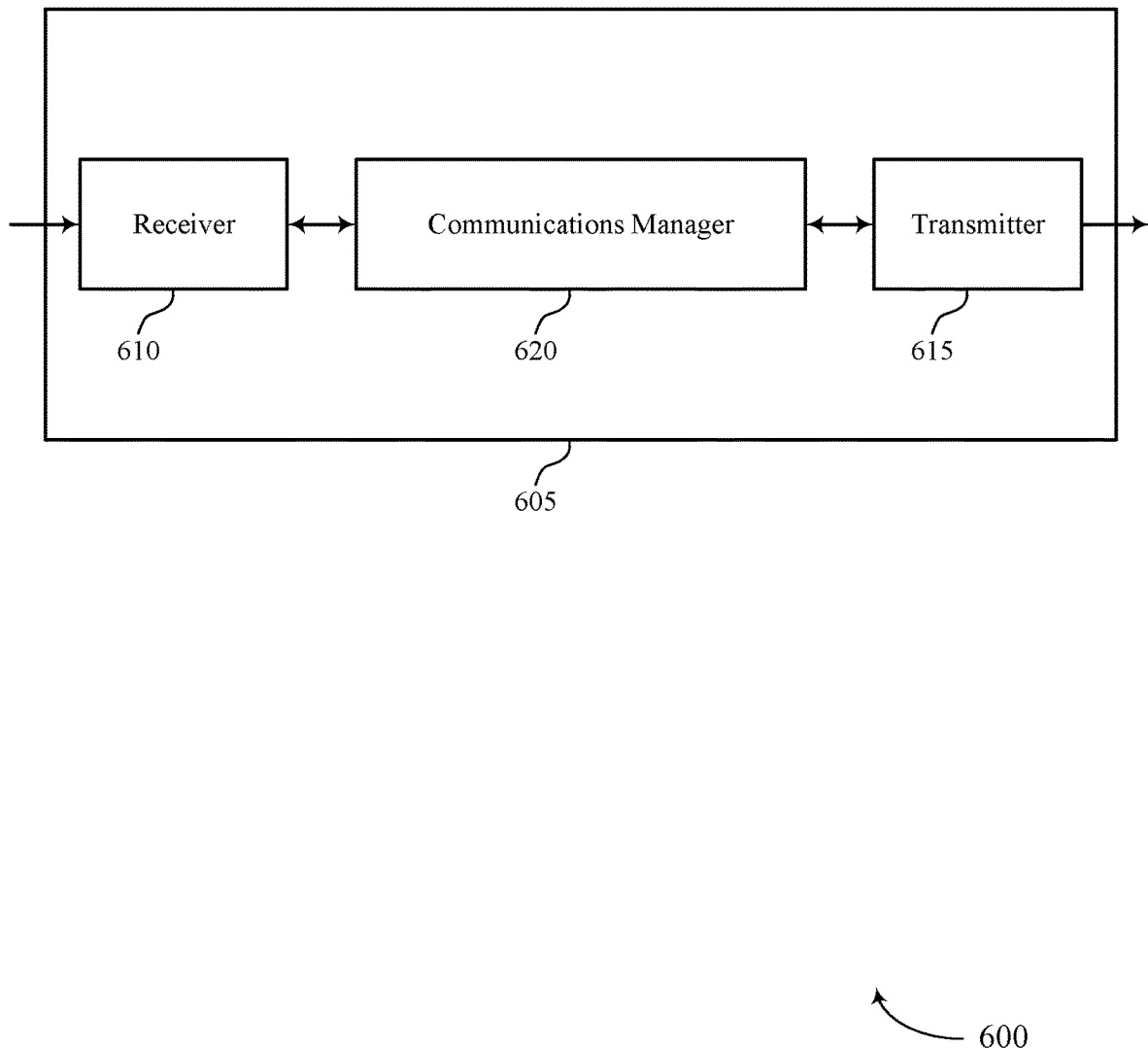
FIGS. 6 and 7 show block diagrams of devices that support CSI-RS configurations for dynamic antenna port adaptation in accordance with one or more aspects of the present disclosure.

FIG. 6 shows a block diagram 600 of a device 605 that supports CSI-RS configurations for dynamic antenna port adaptation in accordance with one or more aspects of the present disclosure. The device 605 may be an example of aspects of a UE 115 as described herein. The device 605 may include a receiver 610, a transmitter 615, and a communications manager 620. The device 605 may also include a processor (not shown). Each of these components may be in communication with one another (e.g., via one or more buses).

The receiver 610 may provide a means for receiving information such as packets, user data, control information, or any combination thereof associated with various information channels (e.g., control channels, data channels, information channels related to CSI-RS configurations for dynamic antenna port adaptation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to CSI-RS configurations for dynamic antenna port adaptation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of CSI-RS configurations for dynamic antenna port adaptation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving a CSI report configuration message indicating a set of multiple codebook configurations associated with a set of multiple antenna port configurations. The communications manager 620 may be configured as or otherwise support a means for transmitting a CSI report indicating one or more codebook configurations of the set of multiple codebook configurations, where CSI included in the CSI report is based on the one or more codebook configurations. The communications manager 620 may be configured as or otherwise support a means for communicating with a network entity based on the CSI report indicating the one or more codebook configurations.

By including or configuring the communications manager 620 in accordance with examples as described herein, the device 605 (e.g., a processor controlling or otherwise coupled with the receiver 610, the transmitter 615, the communications manager 620, or any combination thereof) may support techniques for reduced power consumption, more efficient utilization of communication resources, and improved energy efficiency.

Figure 7:
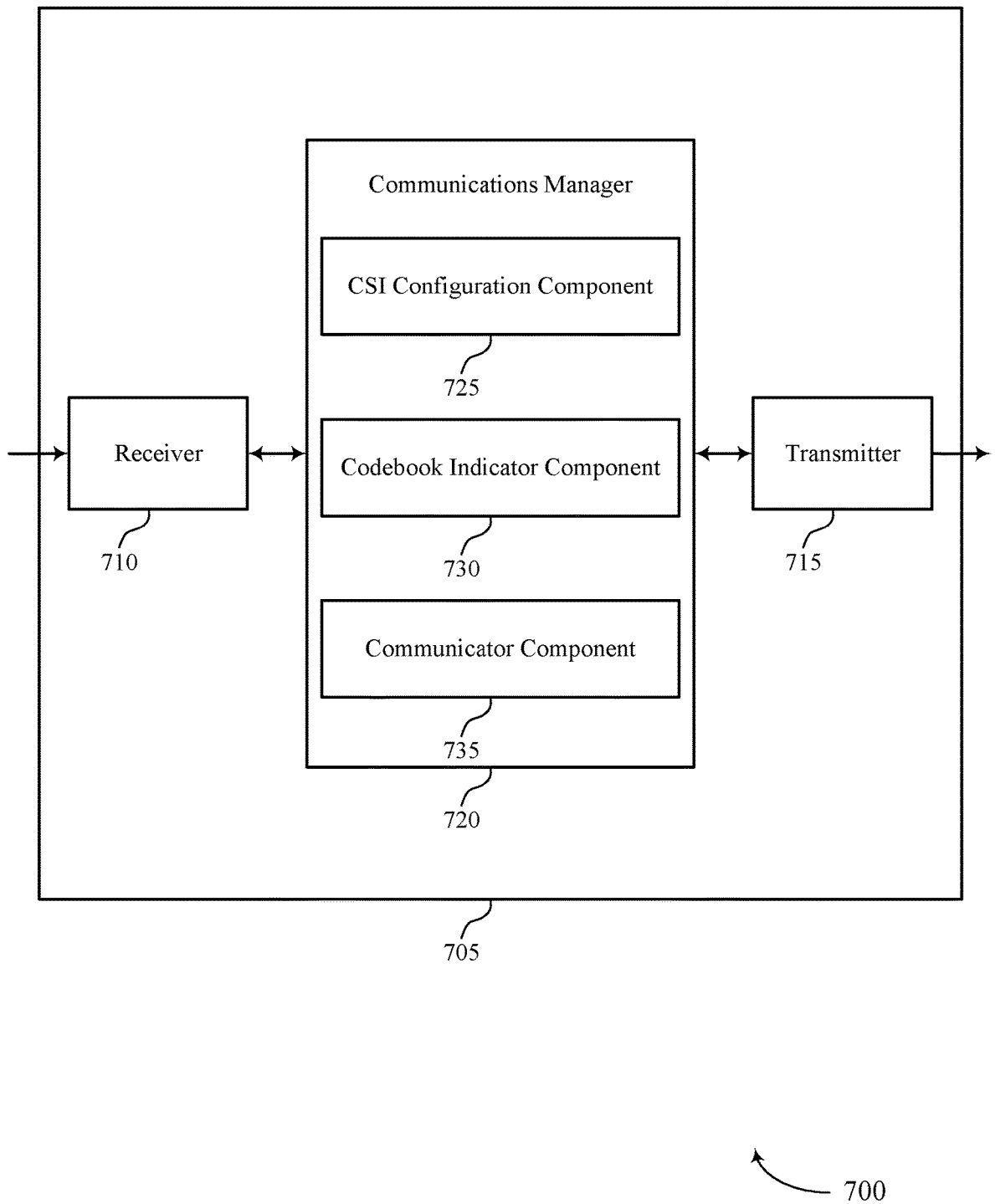

FIG. 7 shows a block diagram 700 of a device 705 that supports CSI-RS configurations for dynamic antenna port adaptation in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor (not shown). Each of these components may be in communication with one another (e.g., via one or more buses).

The receiver 710 may provide a means for receiving information such as packets, user data, control information, or any combination thereof associated with various information channels (e.g., control channels, data channels, information channels related to CSI-RS configurations for dynamic antenna port adaptation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to CSI-RS configurations for dynamic antenna port adaptation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of CSI-RS configurations for dynamic antenna port adaptation as described herein. For example, the communications manager 720 may include a CSI configuration component 725, a codebook indicator component 730, a communicator component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The CSI configuration component 725 may be configured as or otherwise support a means for receiving a CSI report configuration message indicating a set of multiple codebook configurations associated with a set of multiple antenna port configurations. The codebook indicator component 730 may be configured as or otherwise support a means for transmitting a CSI report indicating one or more codebook configurations of the set of multiple codebook configurations, where CSI included in the CSI report is based on the one or more codebook configurations. The communicator component 735 may be configured as or otherwise support a means for communicating with a network entity based on the CSI report indicating the one or more codebook configurations.

Figure 8:
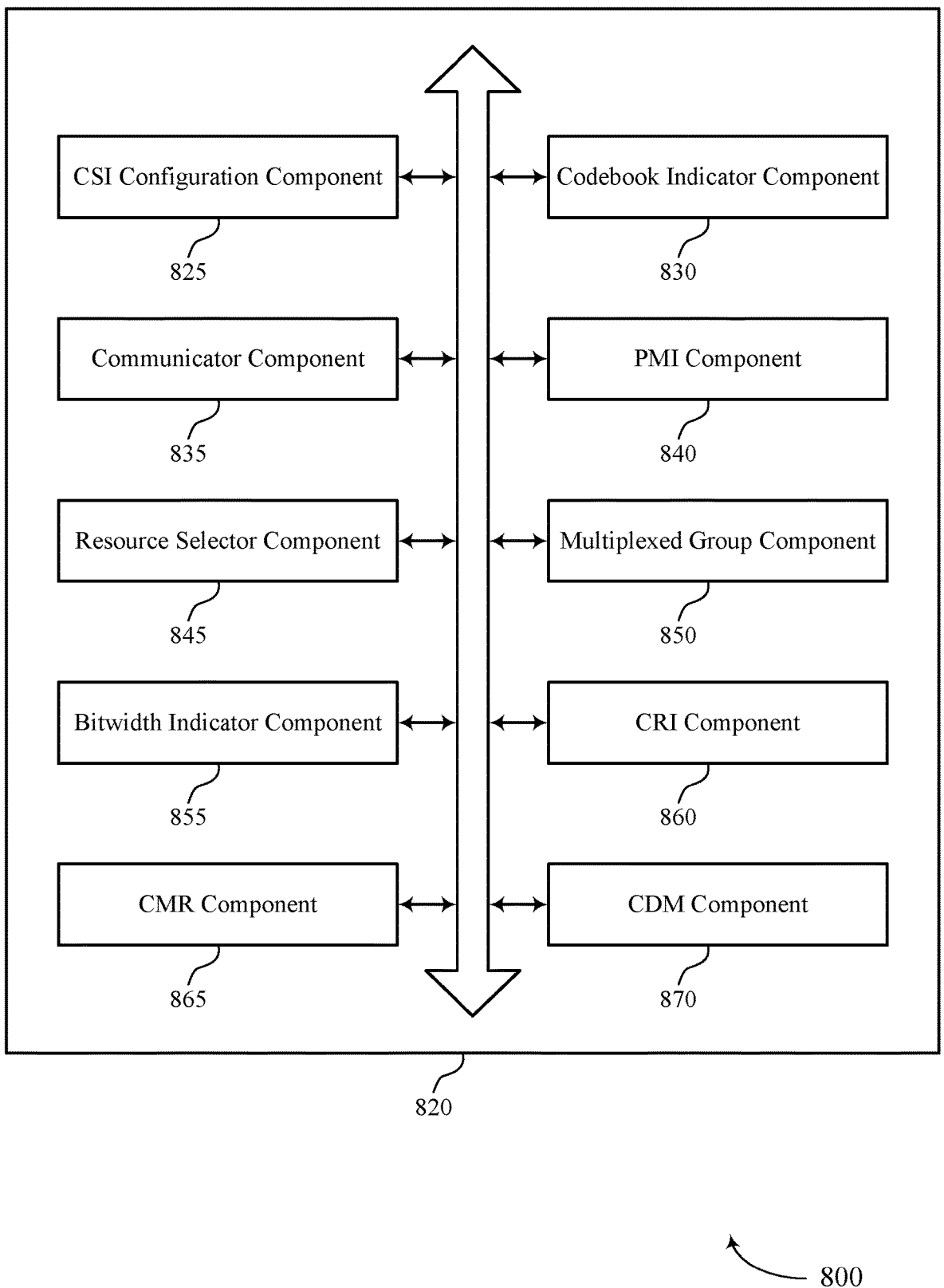
FIG. 8 shows a block diagram of a communications manager that supports CSI-RS configurations for dynamic antenna port adaptation in accordance with one or more aspects of the present disclosure.

FIG. 8 shows a block diagram 800 of a communications manager 820 that supports CSI-RS configurations for dynamic antenna port adaptation in accordance with one or more aspects of the present disclosure. The communications manager 820 may be an example of aspects of a communications manager 620, a communications manager 720, or both, as described herein. The communications manager 820, or various components thereof, may be an example of means for performing various aspects of CSI-RS configurations for dynamic antenna port adaptation as described herein. For example, the communications manager 820 may include a CSI configuration component 825, a codebook indicator component 830, a communicator component 835, a PMI component 840, a resource selector component 845, a multiplexed group component 850, a bitwidth indicator component 855, a CRI component 860, an CMR component 865, a CDM component 870, or any combination thereof. Each of these components may communicate, directly or indirectly, with one another (e.g., via one or more buses).

The communications manager 820 may support wireless communication at a UE in accordance with examples as disclosed herein. The CSI configuration component 825 may be configured as or otherwise support a means for receiving a CSI report configuration message indicating a set of multiple codebook configurations associated with a set of multiple antenna port configurations. The codebook indicator component 830 may be configured as or otherwise support a means for transmitting a CSI report indicating one or more codebook configurations of the set of multiple codebook configurations, where CSI included in the CSI report is based on the one or more codebook configurations. The communicator component 835 may be configured as or otherwise support a means for communicating with a network entity based on the CSI report indicating the one or more codebook configurations.

In some examples, to support transmitting the CSI report, the codebook indicator component 830 may be configured as or otherwise support a means for transmitting an indication based on a set of multiple resources indicated in the CSI report configuration message and the set of multiple codebook configurations, where the indication includes an implicit indication of the one or more codebook configurations.

In some examples, the resource selector component 845 may be configured as or otherwise support a means for selecting one or more resources of the set of multiple resources indicated in the CSI report configuration message. In some examples, the multiplexed group component 850 may be configured as or otherwise support a means for selecting one or more multiplexed groups associated with resources mapped to the set of multiple antenna port configurations. In some examples, the bitwidth indicator component 855 may be configured as or otherwise support a means for determining a bitwidth of the indication based on the selected one or more resources and the selected one or more multiplexed groups, where transmitting the CSI report is further based on the determined bitwidth.

In some examples, the bitwidth indicator component 855 may be configured as or otherwise support a means for determining a first portion of the indication based on selecting the one or more resources of the set of multiple resources. In some examples, the bitwidth indicator component 855 may be configured as or otherwise support a means for determining a second portion of the indication based on selecting the one or more multiplexed groups.

In some examples, the bitwidth indicator component 855 may be configured as or otherwise support a means for jointly encoding the selected one or more resources and the selected one or more multiplexed groups, where the bitwidth of the indication is determined based on the encoding, and where transmitting the CSI report is further based on the determined bitwidth.

In some examples, the indication includes a CSI-RS resource indicator. In some examples, the set of multiple resources indicated in the CSI report configuration message include CMRs. In some examples, one or more multiplexed groups associated with resources mapped to the set of multiple antenna port configurations include one or more CDM groups, where the indication is further based on the one or more CDM groups.

In some examples, to support transmitting the CSI report, the codebook indicator component 830 may be configured as or otherwise support a means for transmitting a field indicating an index of the one or more codebook configurations of the set of multiple codebook configurations, where the field includes an explicit indication of the one or more codebook configurations.

In some examples, the codebook indicator component 830 may be configured as or otherwise support a means for determining a constant bitwidth of the field based on a maximum number of codebook configurations configurable by the CSI report configuration message.

In some examples, the PMI component 840 may be configured as or otherwise support a means for determining a bitwidth for a PMI based on the one or more codebook configurations of the set of multiple codebook configurations, where transmitting the CSI report further includes transmitting the PMI.

Figure 9:
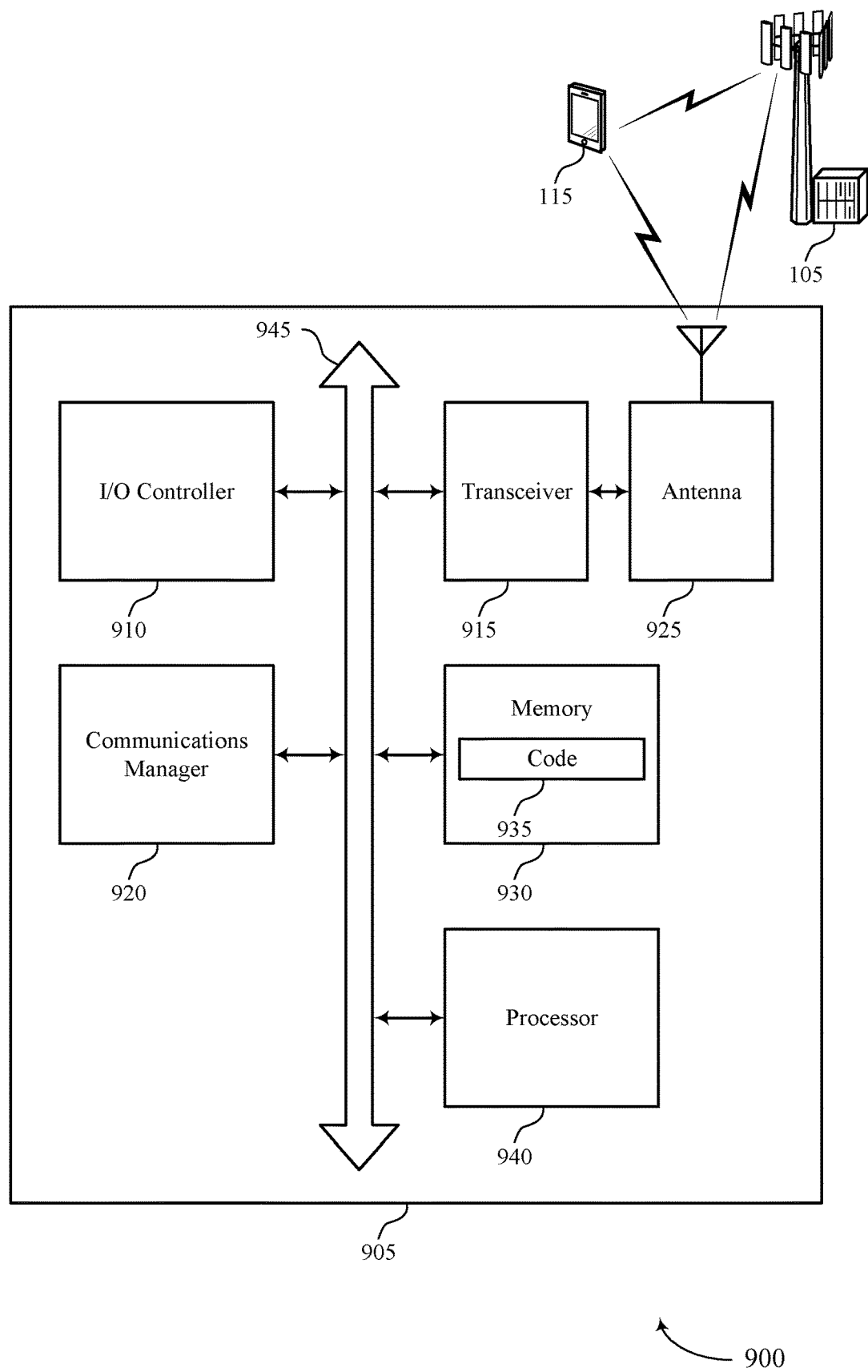
FIG. 9 shows a diagram of a system including a device that supports CSI-RS configurations for dynamic antenna port adaptation in accordance with one or more aspects of the present disclosure.

FIG. 9 shows a diagram of a system 900 including a device 905 that supports CSI-RS configurations for dynamic antenna port adaptation in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem (not shown) to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting CSI-RS configurations for dynamic antenna port adaptation). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a CSI report configuration message indicating a set of multiple codebook configurations associated with a set of multiple antenna port configurations. The communications manager 920 may be configured as or otherwise support a means for transmitting a CSI report indicating one or more codebook configurations of the set of multiple codebook configurations, where CSI included in the CSI report is based on the one or more codebook configurations. The communications manager 920 may be configured as or otherwise support a means for communicating with a network entity based on the CSI report indicating the one or more codebook configurations.

By including or configuring the communications manager 920 in accordance with examples as described herein, the device 905 may support techniques for reduced power consumption, more efficient utilization of communication resources, and improved energy efficiency.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described herein with reference to the communications manager 920 may be supported by or performed by the processor 940, the memory 930, the code 935, or any combination thereof. For example, the code 935 may include instructions executable by the processor 940 to cause the device 905 to perform various aspects of CSI-RS configurations for dynamic antenna port adaptation as described herein, or the processor 940 and the memory 930 may be otherwise configured to perform or support such operations.

Figure 10:
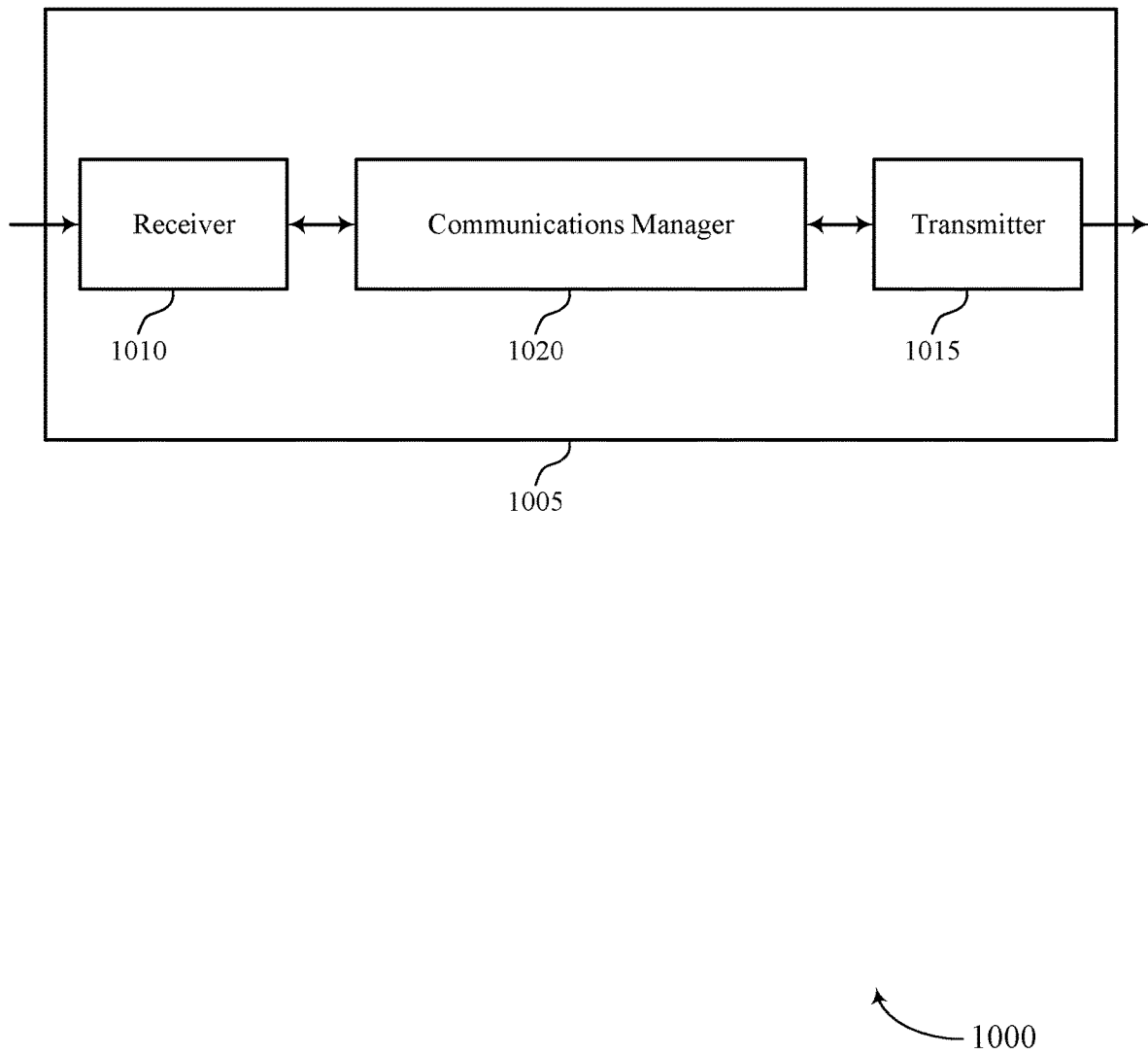
FIGS. 10 and 11 show block diagrams of devices that support CSI-RS configurations for dynamic antenna port adaptation in accordance with one or more aspects of the present disclosure.

FIG. 10 shows a block diagram 1000 of a device 1005 that supports CSI-RS configurations for dynamic antenna port adaptation in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor (not shown). Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of CSI-RS configurations for dynamic antenna port adaptation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for outputting a CSI report configuration message indicating a set of multiple codebook configurations associated with a set of multiple antenna port configurations. The communications manager 1020 may be configured as or otherwise support a means for obtaining a CSI report indicating one or more codebook configurations of the set of multiple codebook configurations, where CSI included in the CSI report is determined based on the one or more codebook configurations. The communications manager 1020 may be configured as or otherwise support a means for communicating with a UE based on the CSI report indicating the one or more codebook configurations.

By including or configuring the communications manager 1020 in accordance with examples as described herein, the device 1005 (e.g., a processor controlling or otherwise coupled with the receiver 1010, the transmitter 1015, the communications manager 1020, or any combination thereof) may support techniques for reduced power consumption, more efficient utilization of communication resources, and improved energy efficiency.

Figure 11:
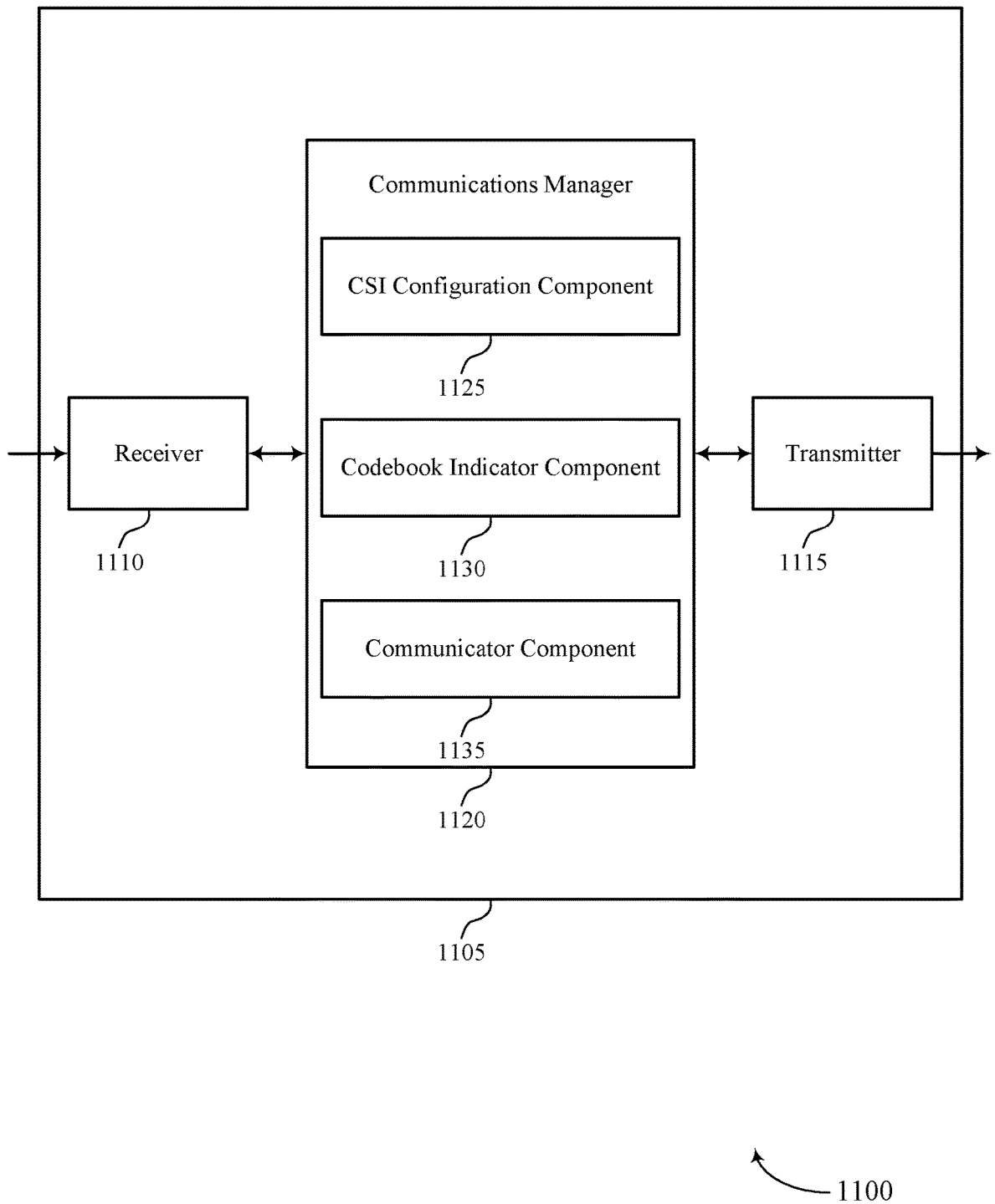

FIG. 11 shows a block diagram 1100 of a device 1105 that supports CSI-RS configurations for dynamic antenna port adaptation in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor (not shown). Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of CSI-RS configurations for dynamic antenna port adaptation as described herein. For example, the communications manager 1120 may include a CSI configuration component 1125, a codebook indicator component 1130, a communicator component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The CSI configuration component 1125 may be configured as or otherwise support a means for outputting a CSI report configuration message indicating a set of multiple codebook configurations associated with a set of multiple antenna port configurations. The codebook indicator component 1130 may be configured as or otherwise support a means for obtaining a CSI report indicating one or more codebook configurations of the set of multiple codebook configurations, where CSI included in the CSI report is determined based on the one or more codebook configurations. The communicator component 1135 may be configured as or otherwise support a means for communicating with a UE based on the CSI report indicating the one or more codebook configurations.

Figure 12:
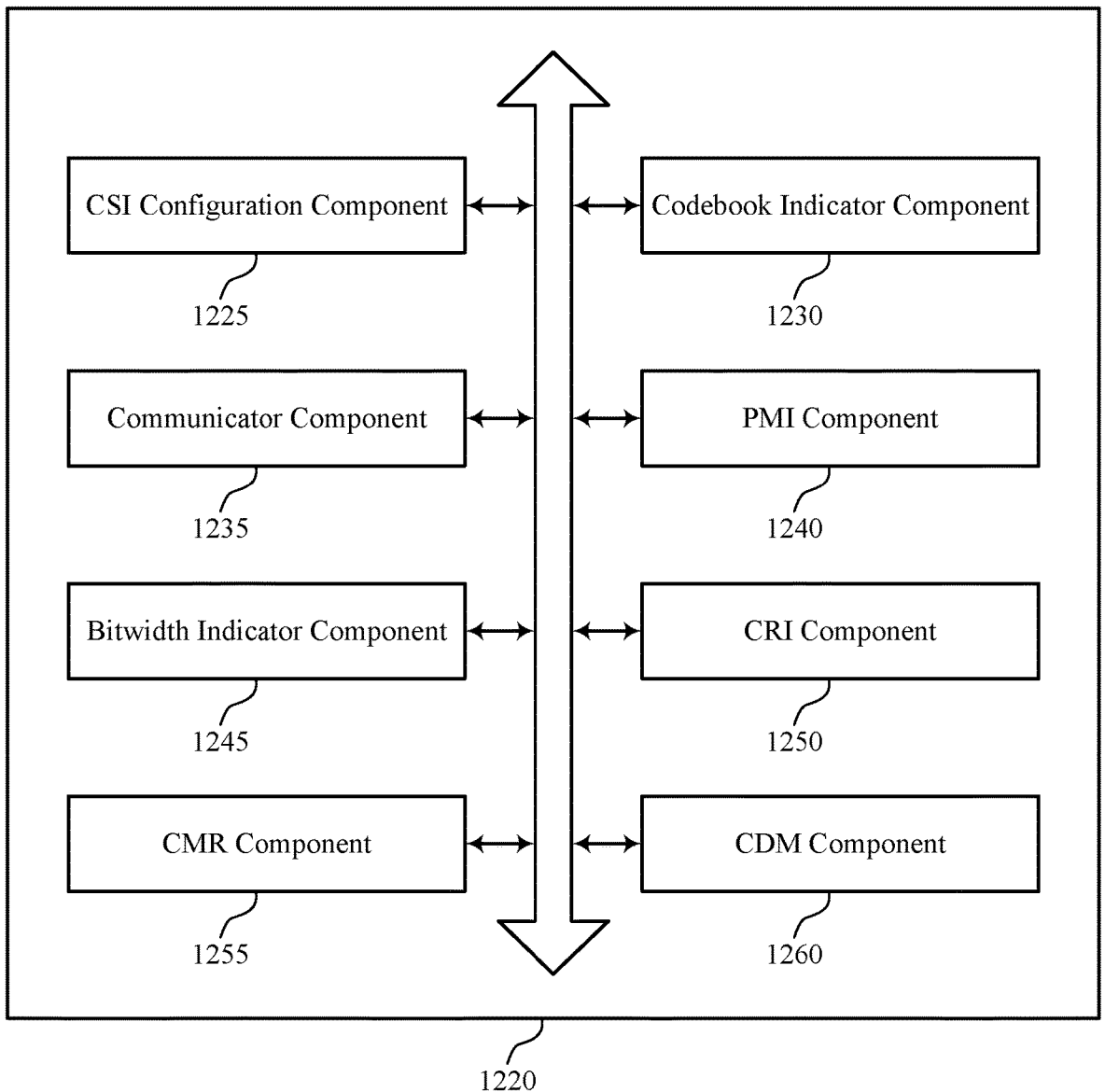
FIG. 12 shows a block diagram of a communications manager that supports CSI-RS configurations for dynamic antenna port adaptation in accordance with one or more aspects of the present disclosure.

FIG. 12 shows a block diagram 1200 of a communications manager 1220 that supports CSI-RS configurations for dynamic antenna port adaptation in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of CSI-RS configurations for dynamic antenna port adaptation as described herein. For example, the communications manager 1220 may include a CSI configuration component 1225, a codebook indicator component 1230, a communicator component 1235, a PMI component 1240, a bitwidth indicator component 1245, a CRI component 1250, an CMR component 1255, a CDM component 1260, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The CSI configuration component 1225 may be configured as or otherwise support a means for outputting a CSI report configuration message indicating a set of multiple codebook configurations associated with a set of multiple antenna port configurations. The codebook indicator component 1230 may be configured as or otherwise support a means for obtaining a CSI report indicating one or more codebook configurations of the set of multiple codebook configurations, where CSI included in the CSI report is determined based on the one or more codebook configurations. The communicator component 1235 may be configured as or otherwise support a means for communicating with a UE based on the CSI report indicating the one or more codebook configurations.

In some examples, to support obtaining the CSI report, the codebook indicator component 1230 may be configured as or otherwise support a means for obtaining an indication based on a set of multiple resources indicated in the CSI report configuration message and the set of multiple codebook configurations, where the indication includes an implicit indication of the one or more codebook configurations.

In some examples, the bitwidth indicator component 1245 may be configured as or otherwise support a means for determining a bitwidth of the indication, where the bitwidth is determined based on selected one or more resources and selected one or more multiplexed groups associated with the CSI, where the obtaining the CSI report is further based on the determined bitwidth.

In some examples, the bitwidth indicator component 1245 may be configured as or otherwise support a means for determining a first portion of the indication based on the selected one or more resources. In some examples, the bitwidth indicator component 1245 may be configured as or otherwise support a means for determining a second portion of the indication based on the selected one or more multiplexed groups.

In some examples, the bitwidth indicator component 1245 may be configured as or otherwise support a means for determining a joint encoding of the selected one or more resources and the selected one or more multiplexed groups, where the bitwidth of the indication is determined based on the joint encoding, and where obtaining the CSI report is further based on the determined bitwidth.

In some examples, the indication includes a CSI-RS resource indicator. In some examples, the set of multiple resources indicated in the CSI report configuration message include CMRs. In some examples, one or more multiplexed groups associated with resources mapped to the set of multiple antenna port configurations include one or more CDM groups, where the indication is further based on the one or more CDM groups.

In some examples, to support obtaining the CSI report, the codebook indicator component 1230 may be configured as or otherwise support a means for obtaining a field indicating an index of the one or more codebook configurations of the set of multiple codebook configurations, where the field includes an explicit indication of the one or more codebook configurations.

In some examples, the codebook indicator component 1230 may be configured as or otherwise support a means for determining a constant bitwidth of the field based on a maximum number of codebook configurations configurable by the CSI report configuration message.

In some examples, the PMI component 1240 may be configured as or otherwise support a means for determining a PMI bitwidth included in the CSI report, where the PMI bitwidth is associated with the one or more codebook configurations.

Figure 13:
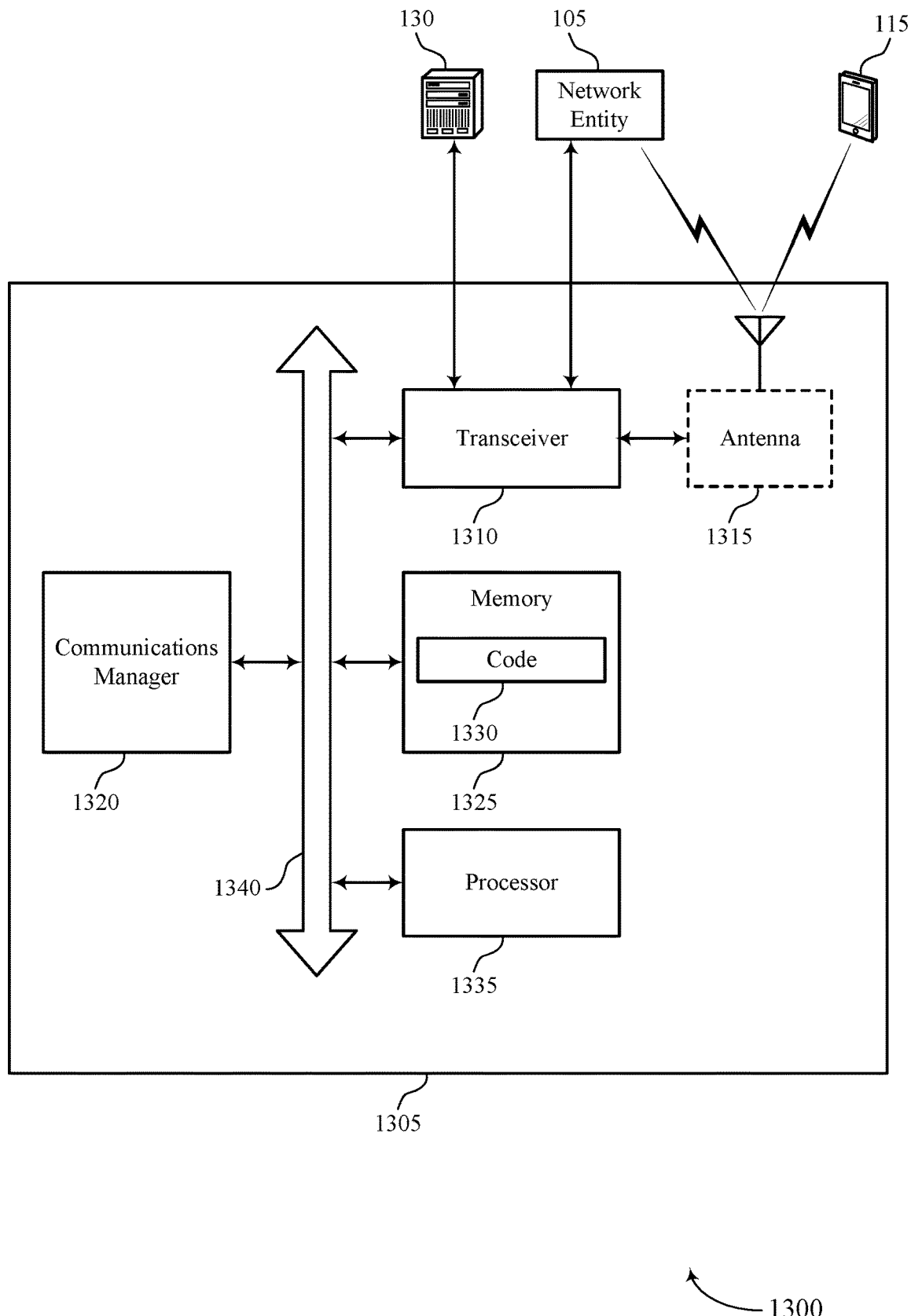
FIG. 13 shows a diagram of a system including a device that supports CSI-RS configurations for dynamic antenna port adaptation in accordance with one or more aspects of the present disclosure.

FIG. 13 shows a diagram of a system 1300 including a device 1305 that supports CSI-RS configurations for dynamic antenna port adaptation in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem (not shown) to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting CSI-RS configurations for dynamic antenna port adaptation). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for outputting a CSI report configuration message indicating a set of multiple codebook configurations associated with a set of multiple antenna port configurations. The communications manager 1320 may be configured as or otherwise support a means for obtaining a CSI report indicating one or more codebook configurations of the set of multiple codebook configurations, where CSI included in the CSI report is determined based on the one or more codebook configurations. The communications manager 1320 may be configured as or otherwise support a means for communicating with a UE based on the CSI report indicating the one or more codebook configurations.

By including or configuring the communications manager 1320 in accordance with examples as described herein, the device 1305 may support techniques for reduced power consumption, more efficient utilization of communication resources, and improved energy efficiency.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described herein with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of CSI-RS configurations for dynamic antenna port adaptation as described herein, or the processor 1335 and the memory 1325 may be otherwise configured to perform or support such operations.

Figure 14:
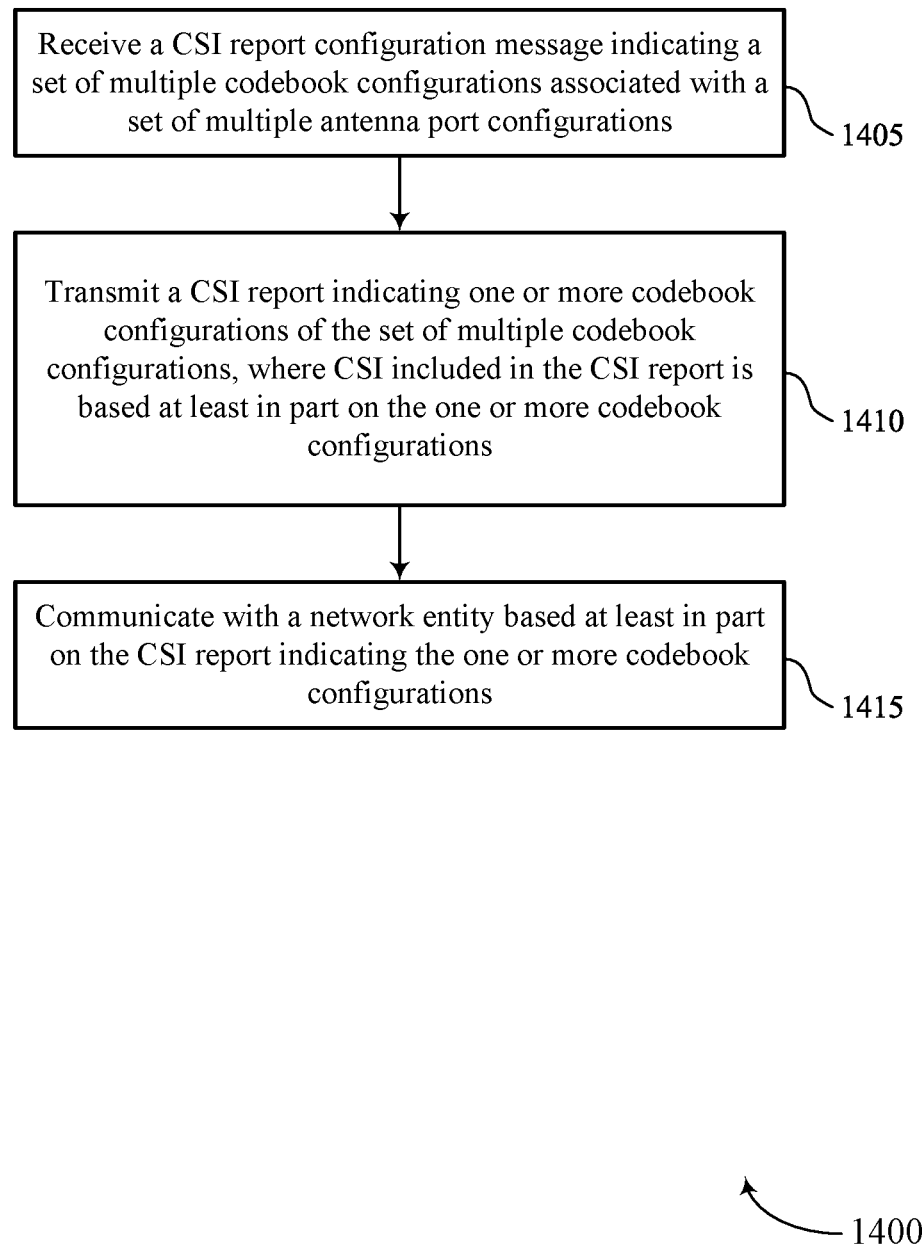
FIGS. 14 through 17 show flowcharts illustrating methods that support CSI-RS configurations for dynamic antenna port adaptation in accordance with one or more aspects of the present disclosure.

FIG. 14 shows a flowchart illustrating a method 1400 that supports CSI-RS configurations for dynamic antenna port adaptation in accordance with one or more aspects of the present disclosure. The operations of the method 1400 may be implemented by a UE or its components as described herein. For example, the operations of the method 1400 may be performed by a UE 115 as described herein with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a CSI report configuration message indicating a set of multiple codebook configurations associated with a set of multiple antenna port configurations. The operations of 1405 may be performed in accordance with examples as disclosed herein. In some examples, aspects of the operations of 1405 may be performed by a CSI configuration component 825 as described herein with reference to FIG. 8.

At 1410, the method may include transmitting a CSI report indicating one or more codebook configurations of the set of multiple codebook configurations, where CSI included in the CSI report is based at least in part on the one or more codebook configurations. The operations of 1410 may be performed in accordance with examples as disclosed herein. In some examples, aspects of the operations of 1410 may be performed by a codebook indicator component 830 as described herein with reference to FIG. 8.

At 1415, the method may include communicating with a network entity based at least in part on the CSI report indicating the one or more codebook configurations. The operations of 1415 may be performed in accordance with examples as disclosed herein. In some examples, aspects of the operations of 1415 may be performed by a communicator component 835 as described herein with reference to FIG. 8.

Figure 15:
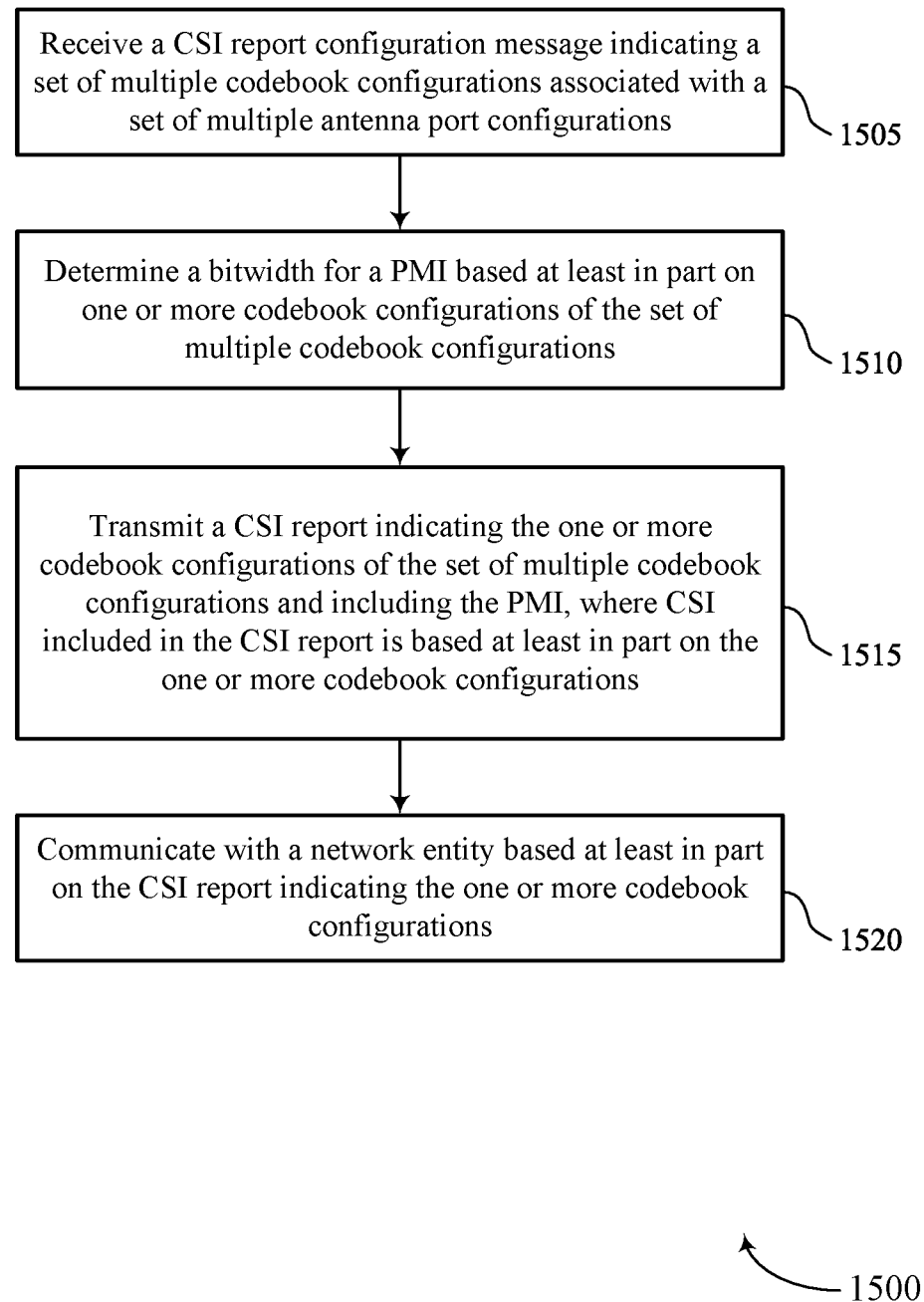

FIG. 15 shows a flowchart illustrating a method 1500 that supports CSI-RS configurations for dynamic antenna port adaptation in accordance with one or more aspects of the present disclosure. The operations of the method 1500 may be implemented by a UE or its components as described herein. For example, the operations of the method 1500 may be performed by a UE 115 as described herein with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a CSI report configuration message indicating a set of multiple codebook configurations associated with a set of multiple antenna port configurations. The operations of 1505 may be performed in accordance with examples as disclosed herein. In some examples, aspects of the operations of 1505 may be performed by a CSI configuration component 825 as described herein with reference to FIG. 8.

At 1510, the method may include determining a bitwidth for a PMI based at least in part on one or more codebook configurations of the set of multiple codebook configurations. The operations of 1510 may be performed in accordance with examples as disclosed herein. In some examples, aspects of the operations of 1510 may be performed by a PMI component 840 as described herein with reference to FIG. 8.

At 1515, the method may include transmitting a CSI report indicating the one or more codebook configurations of the set of multiple codebook configurations and including the PMI, where CSI included in the CSI report is based at least in part on the one or more codebook configurations. The operations of 1515 may be performed in accordance with examples as disclosed herein. In some examples, aspects of the operations of 1515 may be performed by a codebook indicator component 830 as described herein with reference to FIG. 8.

At 1520, the method may include communicating with a network entity based at least in part on the CSI report indicating the one or more codebook configurations. The operations of 1520 may be performed in accordance with examples as disclosed herein. In some examples, aspects of the operations of 1520 may be performed by a communicator component 835 as described herein with reference to FIG. 8.

Figure 16:
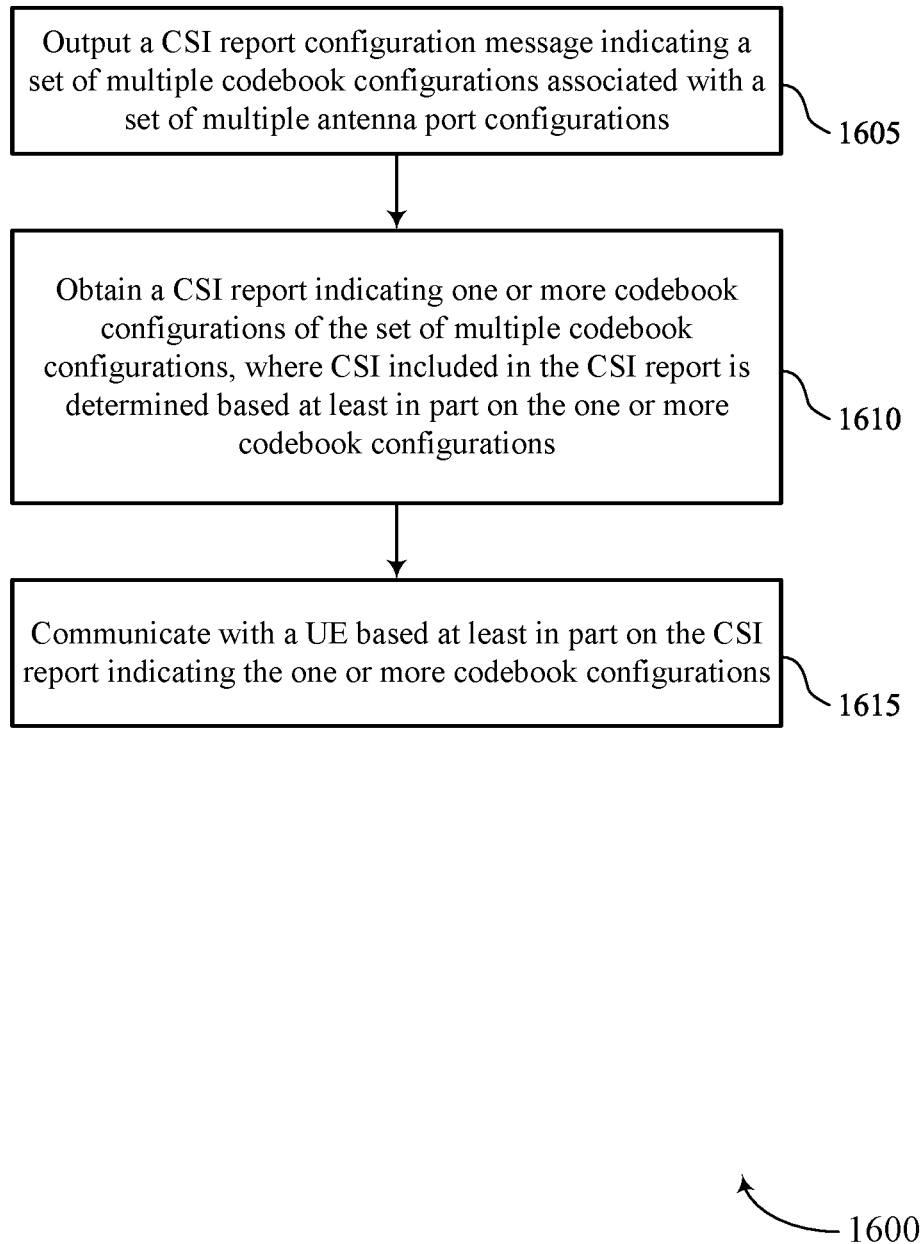

FIG. 16 shows a flowchart illustrating a method 1600 that supports CSI-RS configurations for dynamic antenna port adaptation in accordance with one or more aspects of the present disclosure. The operations of the method 1600 may be implemented by a network entity or its components as described herein. For example, the operations of the method 1600 may be performed by a network entity as described herein with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include outputting a CSI report configuration message indicating a set of multiple codebook configurations associated with a set of multiple antenna port configurations. The operations of 1605 may be performed in accordance with examples as disclosed herein. In some examples, aspects of the operations of 1605 may be performed by a CSI configuration component 1225 as described herein with reference to FIG. 12.

At 1610, the method may include obtaining a CSI report indicating one or more codebook configurations of the set of multiple codebook configurations, where CSI included in the CSI report is determined based at least in part on the one or more codebook configurations. The operations of 1610 may be performed in accordance with examples as disclosed herein. In some examples, aspects of the operations of 1610 may be performed by a codebook indicator component 1230 as described herein with reference to FIG. 12.

At 1615, the method may include communicating with a UE based at least in part on the CSI report indicating the one or more codebook configurations. The operations of 1615 may be performed in accordance with examples as disclosed herein. In some examples, aspects of the operations of 1615 may be performed by a communicator component 1235 as described herein with reference to FIG. 12.

Figure 17:
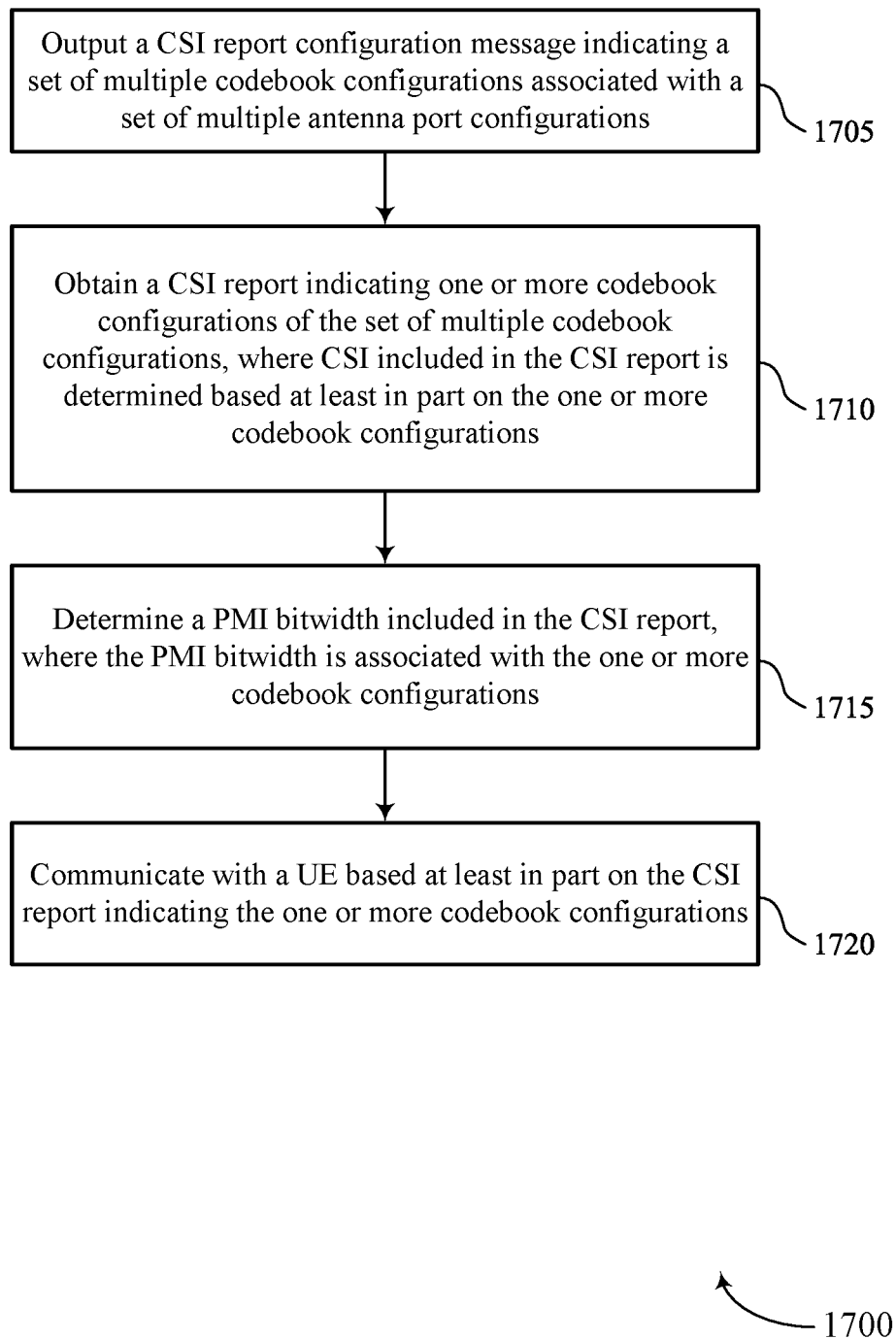

FIG. 17 shows a flowchart illustrating a method 1700 that supports CSI-RS configurations for dynamic antenna port adaptation in accordance with one or more aspects of the present disclosure. The operations of the method 1700 may be implemented by a network entity or its components as described herein. For example, the operations of the method 1700 may be performed by a network entity as described herein with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include outputting a CSI report configuration message indicating a set of multiple codebook configurations associated with a set of multiple antenna port configurations. The operations of 1705 may be performed in accordance with examples as disclosed herein. In some examples, aspects of the operations of 1705 may be performed by a CSI configuration component 1225 as described herein with reference to FIG. 12.

At 1710, the method may include obtaining a CSI report indicating one or more codebook configurations of the set of multiple codebook configurations, where CSI included in the CSI report is determined based at least in part on the one or more codebook configurations. The operations of 1710 may be performed in accordance with examples as disclosed herein. In some examples, aspects of the operations of 1710 may be performed by a codebook indicator component 1230 as described herein with reference to FIG. 12.

At 1715, the method may include determining a PMI bitwidth included in the CSI report, where the PMI bitwidth is associated with the one or more codebook configurations. The operations of 1715 may be performed in accordance with examples as disclosed herein. In some examples, aspects of the operations of 1715 may be performed by a PMI component 1240 as described herein with reference to FIG. 12.

At 1720, the method may include communicating with a UE based at least in part on the CSI report indicating the one or more codebook configurations. The operations of 1720 may be performed in accordance with examples as disclosed herein. In some examples, aspects of the operations of 1720 may be performed by a communicator component 1235 as described herein with reference to FIG. 12.

The following provides an overview of aspects of the present disclosure:

Aspect 1: A method for wireless communication at a UE, comprising: receiving a CSI report configuration message indicating a plurality of codebook configurations associated with a plurality of antenna port configurations; transmitting a CSI report indicating one or more codebook configurations of the plurality of codebook configurations, wherein CSI included in the CSI report is based at least in part on the one or more codebook configurations; and communicating with a network entity based at least in part on the CSI report indicating the one or more codebook configurations.

Aspect 2: The method of aspect 1, wherein transmitting the CSI report comprises: transmitting an indication based at least in part on a plurality of resources indicated in the CSI report configuration message and the plurality of codebook configurations, wherein the indication comprises an implicit indication of the one or more codebook configurations.

Aspect 3: The method of aspect 2, further comprising: selecting one or more resources of the plurality of resources indicated in the CSI report configuration message; selecting one or more multiplexed groups associated with resources mapped to the plurality of antenna port configurations; and determining a bitwidth of the indication based at least in part on the selected one or more resources and the selected one or more multiplexed groups, wherein transmitting the CSI report is further based at least in part on the determined bitwidth.

Aspect 4: The method of aspect 3, further comprising: determining a first portion of the indication based at least in part on selecting the one or more resources of the plurality of resources; and determining a second portion of the indication based at least in part on selecting the one or more multiplexed groups.

Aspect 5: The method of any of aspects 3 through 4, further comprising: jointly encoding the selected one or more resources and the selected one or more multiplexed groups, wherein the bitwidth of the indication is determined based at least in part on the encoding, and wherein transmitting the CSI report is further based at least in part on the determined bitwidth.

Aspect 6: The method of any of aspects 2 through 5, wherein the indication comprises a CRI; the plurality of resources indicated in the CSI report configuration message comprise CMRs; and one or more multiplexed groups associated with resources mapped to the plurality of antenna port configurations comprise one or more CDM groups, wherein the indication is further based at least in part on the one or more CDM groups.

Aspect 7: The method of any of aspects 1 through 6, wherein transmitting the CSI report comprises: transmitting a field indicating an index of the one or more codebook configurations of the plurality of codebook configurations, wherein the field comprises an explicit indication of the one or more codebook configurations.

Aspect 8: The method of aspect 7, further comprising: determining a constant bitwidth of the field based at least in part on a maximum number of codebook configurations configurable by the CSI report configuration message.

Aspect 9: The method of any of aspects 1 through 8, further comprising: determining a bitwidth for a CSI based at least in part on the one or more codebook configurations of the plurality of codebook configurations, wherein transmitting the CSI report further comprises transmitting the CSI.

Aspect 10: A method for wireless communication at a network entity, comprising: outputting a CSI report configuration message indicating a plurality of codebook configurations associated with a plurality of antenna port configurations; obtaining a CSI report indicating one or more codebook configurations of the plurality of codebook configurations, wherein CSI included in the CSI report is determined based at least in part on the one or more codebook configurations; and communicating with a UE based at least in part on the CSI report indicating the one or more codebook configurations.

Aspect 11: The method of aspect 10, wherein obtaining the CSI report comprises: obtaining an indication based at least in part on a plurality of resources indicated in the CSI report configuration message and the plurality of codebook configurations, wherein the indication comprises an implicit indication of the one or more codebook configurations.

Aspect 12: The method of aspect 11, further comprising: determining a bitwidth of the indication, wherein the bitwidth is determined based at least in part on selected one or more resources and selected one or more multiplexed groups associated with the CSI, wherein the obtaining the CSI report is further based at least in part on the determined bitwidth.

Aspect 13: The method of aspect 12, further comprising: determining a first portion of the indication based at least in part on the selected one or more resources; and determining a second portion of the indication based at least in part on the selected one or more multiplexed groups.

Aspect 14: The method of any of aspects 12 through 13, further comprising: determining a joint encoding of the selected one or more resources and the selected one or more multiplexed groups, wherein the bitwidth of the indication is determined based at least in part on the joint encoding, and wherein obtaining the CSI report is further based at least in part on the determined bitwidth.

Aspect 15: The method of any of aspects 11 through 14, wherein the indication comprises a CRI; the plurality of resources indicated in the CSI report configuration message comprise CMRs; and one or more multiplexed groups associated with resources mapped to the plurality of antenna port configurations comprise one or more CDM groups, wherein the indication is further based at least in part on the one or more CDM groups.

Aspect 16: The method of any of aspects 10 through 15, wherein obtaining the CSI report comprises: obtaining a field indicating an index of the one or more codebook configurations of the plurality of codebook configurations, wherein the field comprises an explicit indication of the one or more codebook configurations.

Aspect 17: The method of aspect 16, further comprising: determining a constant bitwidth of the field based at least in part on a maximum number of codebook configurations configurable by the CSI report configuration message.

Aspect 18: The method of any of aspects 10 through 17, further comprising: determining a CSI bitwidth included in the CSI report, wherein the CSI bitwidth is associated with the one or more codebook configurations.

Aspect 19: An apparatus for wireless communication at a UE, comprising a processor; memory coupled with the processor; and instructions stored in the memory and executable by the processor to cause the apparatus to perform a method of any of aspects 1 through 9.

Aspect 20: An apparatus for wireless communication at a UE, comprising at least one means for performing a method of any of aspects 1 through 9.

Aspect 21: A non-transitory computer-readable medium storing code for wireless communication at a UE, the code comprising instructions executable by a processor to perform a method of any of aspects 1 through 9.

Aspect 22: An apparatus for wireless communication at a network entity, comprising a processor; memory coupled with the processor; and instructions stored in the memory and executable by the processor to cause the apparatus to perform a method of any of aspects 10 through 18.

Aspect 23: An apparatus for wireless communication at a network entity, comprising at least one means for performing a method of any of aspects 10 through 18.

Aspect 24: A non-transitory computer-readable medium storing code for wireless communication at a network entity, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as any combination of computing devices (e.g., any combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
receiving a channel state information report configuration message indicating a plurality of codebook configurations associated with a plurality of antenna port configurations;

transmitting a channel state information report including a field indicating an index of one or more codebook configurations of the plurality of codebook configurations, wherein channel state information included in the channel state information report is based at least in part on the one or more codebook configurations, and wherein the field comprises an explicit indication of the one or more codebook configurations; and communicating with a network entity based at least in part on the indicated index of the one or more codebook configurations.

2. The method of claim 1, wherein the index indicated by the field included in the channel state information report is based at least in part on a plurality of resources indicated in the channel state information report configuration message and the plurality of codebook configurations.

3. The method of claim 2, further comprising:
selecting one or more resources of the plurality of resources indicated in the channel state information report configuration message;
selecting one or more multiplexed groups associated with resources mapped to the plurality of antenna port configurations; and
determining a bitwidth of the field based at least in part on the selected one or more resources and the selected one or more multiplexed groups, wherein transmitting the channel state information report is further based at least in part on the determined bitwidth.

4. The method of claim 3, further comprising:
determining a first portion of the field based at least in part on selecting the one or more resources of the plurality of resources; and
determining a second portion of the field based at least in part on selecting the one or more multiplexed groups.

5. The method of claim 3, further comprising:
jointly encoding the selected one or more resources and the selected one or more multiplexed groups, wherein the bitwidth of the field is determined based at least in part on the encoding, and wherein transmitting the channel state information report is further based at least in part on the determined bitwidth.

6. The method of claim 2, wherein:
the field further comprises a channel state information reference signal resource indicator;
the plurality of resources indicated in the channel state information report configuration message comprise channel measurement resources; and
one or more multiplexed groups associated with resources mapped to the plurality of antenna port configurations comprise one or more code division multiplexing groups, wherein the field is further based at least in part on the one or more code division multiplexing groups.

7. The method of claim 1, further comprising:
determining a constant bitwidth of the field based at least in part on a maximum number of codebook configurations configurable by the channel state information report configuration message.

8. The method of claim 1, further comprising:
determining a bitwidth for a precoding matrix indicator based at least in part on the one or more codebook configurations of the plurality of codebook configurations, wherein transmitting the channel state information report further comprises transmitting the precoding matrix indicator.

9. A method for wireless communication at a network entity, comprising:

outputting a channel state information report configuration message indicating a plurality of codebook configurations associated with a plurality of antenna port configurations;

obtaining a channel state information report including a field indicating an index of one or more codebook configurations of the plurality of codebook configurations, wherein channel state information included in the channel state information report is determined based at least in part on the one or more codebook configurations, and wherein the field comprises an explicit indication of the one or more codebook configurations; and communicating with a user equipment (UE) based at least in part on the indicated index of the one or more codebook configurations.

10. The method of claim 9, wherein the index indicated by the field included in the channel state information report is based at least in part on a plurality of resources indicated in the channel state information report configuration message and the plurality of codebook configurations.

11. The method of claim 10, further comprising:
determining a bitwidth of the field, wherein the bitwidth is determined based at least in part on selected one or more resources and selected one or more multiplexed groups associated with the channel state information, wherein the obtaining the channel state information report is further based at least in part on the determined bitwidth.

12. The method of claim 11, further comprising:
determining a first portion of the field based at least in part on the selected one or more resources; and
determining a second portion of the field based at least in part on the selected one or more multiplexed groups.

13. The method of claim 11, further comprising:
determining a joint encoding of the selected one or more resources and the selected one or more multiplexed groups, wherein the bitwidth of the field is determined based at least in part on the joint encoding, and wherein obtaining the channel state information report is further based at least in part on the determined bitwidth.

14. The method of claim 10, wherein:
the field further comprises a channel state information reference signal resource indicator;
the plurality of resources indicated in the channel state information report configuration message comprise channel measurement resources; and
one or more multiplexed groups associated with resources mapped to the plurality of antenna port configurations comprise one or more code division multiplexing groups, wherein the field is further based at least in part on the one or more code division multiplexing groups.

15. The method of claim 9, further comprising:
determining a constant bitwidth of the field based at least in part on a maximum number of codebook configurations configurable by the channel state information report configuration message.

16. The method of claim 9, further comprising:
determining a precoding matrix indicator bitwidth included in the channel state information report, wherein the precoding matrix indicator bitwidth is associated with the one or more codebook configurations.

17. An apparatus for wireless communication at a user equipment (UE), comprising:
a processor; and a memory coupled with the processor, with instructions stored in the memory, the instructions being executable by the processor to cause the apparatus to:
receive a channel state information report configuration message indicating a plurality of codebook configurations associated with a plurality of antenna port configurations;
transmit a channel state information report including a field indicating an index of one or more codebook configurations of the plurality of codebook configurations, wherein channel state information included in the channel state information report is based at least in part on the one or more codebook configurations, and wherein the field comprises an explicit indication of the one or more codebook configurations; and
communicate with a network entity based at least in part on the indicated index of the one or more codebook configurations.

18. The apparatus of claim 17, wherein the index indicated by the field included in the channel state information report is
based at least in part on a plurality of resources indicated in the channel state information report configuration message and the plurality of codebook configurations.

19. The apparatus of claim 18, wherein the instructions are further executable by the processor to cause the apparatus to:
select one or more resources of the plurality of resources indicated in the channel state information report configuration message;
select one or more multiplexed groups associated with resources mapped to the plurality of antenna port configurations; and
determine a bitwidth of the field based at least in part on the selected one or more resources and the selected one or more multiplexed groups, wherein transmitting the channel state information report is further based at least in part on the determined bitwidth.

20. The apparatus of claim 19, wherein the instructions are further executable by the processor to cause the apparatus to:
jointly encode the selected one or more resources and the selected one or more multiplexed groups, wherein the bitwidth of the field is determined based at least in part on the encoding, and wherein transmitting the channel state information report is further based at least in part on the determined bitwidth.

21. The apparatus of claim 17, wherein the instructions are further executable by the processor to cause the apparatus to:
determine a bitwidth for a precoding matrix indicator based at least in part on the one or more codebook configurations of the plurality of codebook configurations, wherein transmitting the channel state information report further comprises transmitting the precoding matrix indicator.

22. An apparatus for wireless communication at a network entity, comprising:
a processor; and
a memory coupled with the processor, with instructions stored in the memory, the instructions being executable by the processor to cause the apparatus to:
output a channel state information report configuration message indicating a plurality of codebook configurations associated with a plurality of antenna port configurations;
obtain a channel state information report including a field indicating an index of one or more codebook configurations of the plurality of codebook configurations, wherein channel state information included in the channel state information report is determined based at least in part on the one or more codebook configurations, and wherein the field comprises an explicit indication of the one or more codebook configurations; and
communicate with a user equipment (UE) based at least in part on the indicated index of the one or more codebook configurations.

23. The apparatus of claim 22, wherein the index indicated by the field included in the channel state information report is
based at least in part on a plurality of resources indicated in the channel state information report configuration message and the plurality of codebook configurations.

24. The apparatus of claim 23, wherein the instructions are further executable by the processor to cause the apparatus to:
determine a bitwidth of the field, wherein the bitwidth is determined based at least in part on selected one or more resources and selected one or more multiplexed groups associated with the channel state information, wherein the obtaining the channel state information report is further based at least in part on the determined bitwidth.

25. The apparatus of claim 24, wherein the instructions are further executable by the processor to cause the apparatus to:
determine a joint encoding of the selected one or more resources and the selected one or more multiplexed groups, wherein the bitwidth of the field is determined based at least in part on the joint encoding, and wherein obtaining the channel state information report is further based at least in part on the determined bitwidth.

26. The apparatus of claim 22, wherein the instructions are further executable by the processor to cause the apparatus to:
determine a precoding matrix indicator bitwidth included in the channel state information report, wherein the precoding matrix indicator bitwidth is associated with the one or more codebook configurations.

* * * * *